(12) United States Patent
Fresa

(10) Patent No.: US 12,547,234 B2
(45) Date of Patent: Feb. 10, 2026

(54) SYSTEM, METHOD, AND NON-TRANSITORY COMPUTER-READABLE MEDIUM FOR CRYPTOCURRENCY MINING

(71) Applicant: Marc Fresa, Shelton, CT (US)

(72) Inventor: Marc Fresa, Shelton, CT (US)

( * ) Notice: Subject to any disclaimer, the term of this patent is extended or adjusted under 35 U.S.C. 154(b) by 0 days.

(21) Appl. No.: 18/893,899

(22) Filed: Sep. 23, 2024

(65) Prior Publication Data

US 2025/0014110 A1 Jan. 9, 2025

Related U.S. Application Data

(63) Continuation of application No. 18/154,142, filed on Jan. 13, 2023, now Pat. No. 12,182,871, which is a
(Continued)

(51) Int. Cl.
| | |
|---|---|
| *G06F 1/32* | (2019.01) |
| *G06F 1/3234* | (2019.01) |
| *G06F 1/3296* | (2019.01) |
| *G06Q 40/06* | (2012.01) |
| *G06F 1/26* | (2006.01) |
| *G06F 1/324* | (2019.01) |

(52) U.S. Cl.
CPC .......... *G06F 1/3234* (2013.01); *G06F 1/3296* (2013.01); *G06Q 40/06* (2013.01); *G06Q 40/065* (2025.08); *G06F 1/26* (2013.01); *G06F 1/324* (2013.01)

(58) Field of Classification Search
CPC .............................. G06Q 40/06; G06Q 40/065
See application file for complete search history.

(56) References Cited

U.S. PATENT DOCUMENTS

| | | | |
|---|---|---|---|
| 5,502,838 | A | 3/1996 | Kikinis |
| 5,752,011 | A | 5/1998 | Thomas et al. |

(Continued)

FOREIGN PATENT DOCUMENTS

| | | |
|---|---|---|
| CN | 104238600 | 12/2014 |
| CN | 104879313 | 9/2015 |
| CN | 110895172 | 3/2020 |

OTHER PUBLICATIONS

Canadian Patent Office: Notice of Allowance in Canadian Application No. 3,156,916; dated Aug. 29, 2023.

*Primary Examiner* — Scott C Anderson
(74) *Attorney, Agent, or Firm* — Vaughn Marquis, Esq.

(57) ABSTRACT

A system and method of managing temperature of mining chips provided in cryptocurrency miners. The system and method retrieves metric data that includes a temperature of one or more mining chips, or temperature of one or more hash boards from temperature sensors while mining digital currency, selects a chip profile configuration from a plurality of chip profile configurations based on the temperature in accordance with temperature thresholds, each chip profile configuration includes chip voltages, and chip frequencies, and dynamically adjusts a chip voltage, and chip frequency from a selected chip profile configuration to provide a target chip voltage and a target chip frequency that is supplied to the mining chips to operate the mining chips at an ideal hashrate, or a percentage of an ideal hashrate.

51 Claims, 10 Drawing Sheets

Related U.S. Application Data continuation of application No. 17/716,651, filed on Apr. 8, 2022, now Pat. No. 11,631,138.

(60) Provisional application No. 63/229,685, filed on Aug. 5, 2021.

(56) References Cited

U.S. PATENT DOCUMENTS

| | | |
|---|---|---|
| 5,940,785 A | 8/1999 | Georgiou et al. |
| 6,216,235 B1 | 4/2001 | Thomas et al. |
| 6,243,656 B1 | 6/2001 | Arai et al. |
| 6,487,668 B2 | 11/2002 | Thomas et al. |
| 7,167,993 B1 | 1/2007 | Thomas et al. |
| 7,293,186 B2 | 11/2007 | Thomas et al. |
| 7,418,611 B1 | 8/2008 | Thomas et al. |
| 7,774,627 B2 | 8/2010 | Gaskins et al. |
| 7,814,350 B2 | 10/2010 | Gaskins et al. |
| 7,882,369 B1 | 2/2011 | Kelleher et al. |
| 7,886,164 B1 | 2/2011 | Alben et al. |
| 7,937,599 B1 | 5/2011 | Thomas et al. |
| 8,400,091 B2 | 3/2013 | Sato et al. |
| 8,412,962 B2 | 4/2013 | Gaskins et al. |
| 9,507,369 B2 | 11/2016 | Carlson et al. |
| 9,509,293 B2 | 11/2016 | Li et al. |
| 2013/0166093 A1 | 6/2013 | Kim et al. |
| 2021/0027221 A1* | 1/2021 | Balakrishnan ...... G06F 11/3055 |
| 2023/0101997 A1* | 3/2023 | Kaburlasos ........... G06F 1/3206 |
| | | 713/323 |
| 2023/0176634 A1* | 6/2023 | Winkler ................ G06F 1/3296 |
| | | 700/300 |

\* cited by examiner

| Target Chip Frequency (MHz) | Target Chip Voltage (DC volts) | Power Usage (KW) | Hashrate (hashes per second) | Efficiency watts/th |
|---|---|---|---|---|
| 625 | 15.8 | 1718 | 37,800.00 | 45.46130952 |
| 625 | 16.1 | 1782 | 37,800.00 | 47.13541667 |
| 650 | 15.2 | 1654 | 39,312.00 | 42.06730769 |
| 650 | 15.3 | 1676 | 39,312.00 | 42.62534341 |
| 650 | 15.6 | 1742 | 39,312.00 | 44.29945055 |
| 650 | 15.8 | 1785 | 39,312.00 | 45.41552198 |
| 650 | 16.2 | 1873 | 39,312.00 | 47.64766484 |
| 675 | 15.3 | 1738 | 40,824.00 | 42.58294753 |
| 675 | 15.8 | 1852 | 40,824.00 | 45.3731261 |
| 675 | 16.3 | 1966 | 40,824.00 | 48.16330467 |
| 675 | 17 | 2126 | 40,824.00 | 52.06955467 |
| 675 | 17.3 | 2194 | 40,824.00 | 53.74366182 |
| 700 | 15.8 | 1919 | 42,336.00 | 45.3337585 |
| 700 | 16 | 1967 | 42,336.00 | 46.44982993 |
| 700 | 16.4 | 2061 | 42,336.00 | 48.68197279 |

FIG. 10

SYSTEM, METHOD, AND NON-TRANSITORY COMPUTER-READABLE MEDIUM FOR CRYPTOCURRENCY MINING

CROSS REFERENCE TO RELATED APPLICATION

This application is a Continuation Application of application Ser. No. 18/154,142 filed Jan. 13, 2023, which is a continuation of application Ser. No. 17/716,651 filed Apr. 8, 2022, now U.S. Pat. No. 11,631,138, which claims the benefit of U.S. Provisional Patent Application No. 63/229,685 filed Aug. 5, 2021, the entire contents of each of which are incorporated herein by reference.

BACKGROUND OF THE DISCLOSURE

Managing the efficient operation of cryptocurrency mining machines is important for reducing operating costs, and improving profits. Cryptocurrency mining machines require large amounts of processing power used by mining chips for solving complex mathematical computations when mining digital currency. Because an increase in power consumption results in higher operating costs, mining digital currency can be an expensive endeavor. Mining chips, such as, application-specific interface chips (ASIC), or field programmable gate array chips (FPGA), are embedded with specific mining algorithms tailored for mining different types of digital coins. For example, ASIC chips employ SHA-266 algorithms for mining bitcoins. The speed at which these algorithms solve mathematical equations, or the amount of calculations performed per second, is defined by hashrate. As hashrate increases, so does the speed of mining digital coins which correlates to higher profits.

Various techniques have been implemented to overcome challenges associated with lowering costs while improving operation efficiency of mining machines. In an effort to increase hashrate to garner higher profits, the operating frequency applied to the mining chips is often overclocked to increase the hash rate. However, adjusting the frequency alone of mining chips generally increases hashing power which in turn compromises the operating efficiency of the mining machines. Further, overclocking mining chips, and increasing hashing power, often produces excessive heat that, and if not managed properly, can damage mining chips, and seriously affect the operating efficiency. Although conventional methods of cooling chips have been employed to better manage the heat generated, controlling frequency alone in an effort to manage operating costs and improve profits provides on-going challenges, and limited benefits.

Although prior art systems have employed various strategies for adjusting the operating frequency of mining chips, the operating voltage applied to mining chips, and provided by the power supply of the mining machine, has remained fixed. Maintaining fixed voltages on mining chips not only wastes power, and increases heat, but effects the hashing power and efficiency of mining machines as well. The prior art fails to address the need for dynamically adjusting both the operating voltage, and frequency of mining chips to manage power usage, and hashrate of mining chips based on the measured temperature, in real time, of mining chips. Also, conventional mining systems also adjust the operating frequency of mining chips when mining different types of digital currency to find which digital currency provides the highest profit. However, the prior art fails to address the need for dynamically adjusting both the operating voltage, and operating frequency of mining chips based on profits to find the highest profit when mining a single, type of digital currency.

In accordance with the aforementioned problems provided in the prior art, there is a need for a system, and method for auto-tuning cryptocurrency mining machines by dynamically adjusting both the operating voltage, and operating frequency of ASIC chips based on various condition parameters including temperature, to manage power usage, and hashrate of ASIC mining chips, and applying tuned parameters that provide the highest profit for a single type of digital currency to efficiently and effectively operate cryptocurrency mining machines. There is also a need for a non-transitory computer-readable storage medium that includes a dynamic tuning firmware that is user-friendly, and remotely accessible by users for preconfiguring various operating parameters, and profit variables, and for controlling and managing auto-tuning of the cryptocurrency mining machines.

BRIEF DESCRIPTION OF THE EXEMPLARY EMBODIMENTS

An exemplary embodiment of a non-transitory computer-readable medium may store computer-executable instructions to be executed by a processor in communication with a mining machine having a plurality of hash boards each including a plurality of mining chips. When executed by the processor, the instructions may cause the processor to perform establishing communication with an external device via an external network, retrieving at least one profit variable from the external device via the external network, calculating an estimated profitability of at least a first mining chip of the plurality of mining chips as a function of at least a hashrate of at least the first mining chip, a power consumption of at least the first mining chip, and the at least one profit variable; and sending a command that causes the mining machine to adjust a chip voltage supplied to at least the first mining chip and adjusting a chip frequency of at least the first mining chip to maximize the estimated profitability.

An exemplary embodiment of a non-transitory computer-readable medium may store computer-executable instructions to be executed by a processor in communication with a mining machine having a plurality of hash boards each including a plurality of mining chips. When executed by the processor, the instructions may cause the processor to perform measuring a temperature of at least a first mining chip of the plurality of mining chips or a first hash board of the plurality of hash boards using a temperature sensor, and adjusting a chip voltage supplied to at least the first mining chip or adjusting a chip frequency of at least the first mining chip to control the temperature so as to maintain the temperature within a predetermined temperature range.

An exemplary embodiment of a method for cryptocurrency mining may include providing a mining device including a mother board, a power supply in operable communication with the mother board, an input/output interface in operable communication with the mother board, and a plurality of hash boards each including a plurality of mining chips. The plurality of hash boards may be in operable communication with the mother board. The method may further include establishing communication with the mining device via an external network, establishing communication between the mining device and an external device via the external network, retrieving a profit variable from the external device via the external network, calculating an estimated profitability of at least a first mining chip of the plurality of mining as a function of at least a hashrate of at least the first mining chip, a power consumption of at least the first mining chip, and the at least one profit variable, and adjusting a chip voltage supplied to at least the first mining chip and adjusting a chip frequency of at least the first mining chip to maximize the estimated profitability.

An exemplary embodiment of a system for cryptocurrency mining may include a mining device including a mother board, a power supply in operable communication with the mother board, an input/output interface in operable communication with the mother board, and a plurality of hash boards each including a plurality of mining chips. The plurality of hash boards may be in operable communication with the mother board. The system may further include a dynamic tuning firmware in operable communication with the mother board. The dynamic tuning firmware may be configured to establish communication with an external device via an external network, retrieve a profit variable from the external device via the external network, calculate an estimated profitability of at least a first mining chip of the plurality of mining chips as a function of at least a hashrate of at least the first mining chip, a power consumption of at least the first mining chip, and the at least one profit variable, and send a command that causes the mining machine to adjust a chip voltage supplied to at least the first mining chip and adjust a chip frequency of at least the first mining chip to maximize the estimated profitability.

An exemplary embodiment of a method for cryptocurrency mining may include providing a mining device including a mother board, a power supply in operable communication with the mother board, an input-output interface in operable communication with the mother board, and a plurality of hash boards each comprising a plurality of mining chips. The plurality of hash boards may be in operable communication with the mother board. The method may further include measuring a hashrate of at least the first mining chip, and adjusting a chip frequency of at least the first mining chip to maximize the hashrate of the at least first mining chip for a given voltage of at least the first mining chip.

A non-transitory computer-readable medium storing thereon computer-executable instructions that, when executed by a processor in communication with a mining machine including a plurality of hash boards each including a plurality of mining chips, cause the processor to perform: calculating an estimated profitability of at least a first mining chip of the plurality of mining chips; and sending a command that causes the mining machine to adjust a chip voltage supplied to at least the first mining chip and adjust a chip frequency of at least the first mining chip to maximize the estimated profitability; wherein: the chip voltage and the chip frequency are adjusted while at least the first mining chip is maintained in a mining state.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 10 illustrates a table showing performance values including target chip frequency, target chip voltage, power usage, hashrate, and efficiency of a designated cryptocurrency mining machine.

Figure 1:
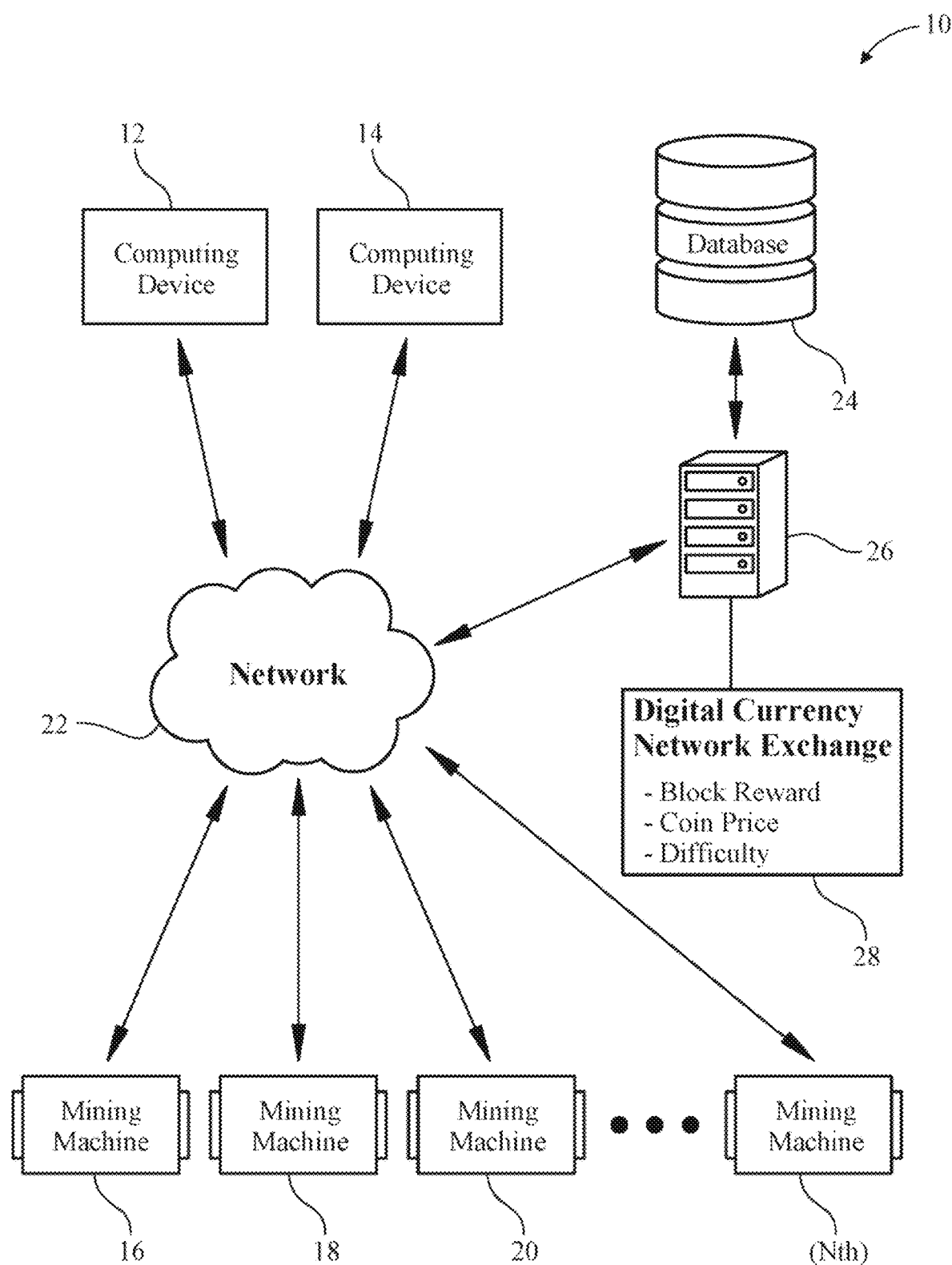
FIG. 1 illustrates a schematic representation of a system, method, and non-transitory computer-readable storage medium for auto-tuning cryptocurrency mining machines based on condition parameters showing computing devices in electrical communication with a plurality of cryptocurrency mining machines via, an electrical communication network, in accordance with one exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to aid in understanding the features of the exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments. It is understood that reference to a particular "exemplary embodiment" of, e.g., a structure, assembly, component, configuration, method, etc. includes exemplary embodiments of, e.g., the associated features, subcomponents, method steps, etc. forming a part of the "exemplary embodiment".

For purposes of this disclosure, the phrases "devices," "systems," and "methods" may be used either individually or in any combination referring without limitation to disclosed components, grouping, arrangements, steps, functions, or processes.

The following detailed description is merely exemplary in nature and is not intended to limit the described embodiments or the application and uses of the described embodiments. As used herein, the word "exemplary" or "illustrative" means "serving as an example, instance, or illustration". Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not limiting, unless the claims expressly state otherwise.

An exemplary embodiment relates to cryptocurrency mining systems and machines, and more particularly, to a system, method, and non-transitory computer-readable storage medium for auto-tuning cryptocurrency mining machines based on condition parameters including temperature, and mining profit.

The term, "cryptocurrency", or "digital currency", as used herein refers to digital or virtual currency such as digital coins, including but not limited to, Bitcoin, Litecoin, Dogecoin, Ethereum, Ripple, Omni, Stellar, NEO, Cardano, and alternative coins.

The term, "tuned parameters", as used herein refers to a target chip voltage, and target chip frequency, that when applied to each ASIC chip of each cryptocurrency mining machine, allows the ASIC chips to operate at a lowest power consumption defined as the lowest chip voltage value needed to overcome ASIC chip instability, and operate at the highest hashrate defined as a chip frequency value that is equal to, or greater than, a hashrate threshold of an ideal hashrate of each ASIC chip.

Referring now to the figures wherein like elements are represented by like numerals throughout, there is shown in FIG. 1, a schematic representation of a system and method for auto-tuning cryptocurrency mining machines 10 based on various condition parameters including temperature and profits, in accordance with one exemplary embodiment. One or more computing devices 12, 14 are used to manage, and control the operation of cryptocurrency mining machines 16, 18, 20, nth over an electrical communication network 22. Each computing device 12, 14 interacts with dynamic tuning firmware, hosted on each cryptocurrency mining machine 16, 18, 20, nth, that includes instructions, programs, and/or computer code stored in a computer readable medium to control to manage the efficient operation of the mining machines, and other aspects and methodologies of the present disclosure. Miner management software can be hosted on each computing device 12, 14 for interfacing and communicating with, and for managing, the dynamic tuning firmware hosted on each cryptocurrency mining machine. In one alternative embodiment, the miner management software can be hosted on a cloud-based system that is maintained by a third party. A mobile application may be provided for use on smartphones to communicate directly with the dynamic tuning software, or with the miner management software hosted on a cloud-based system, or on each computing device. The miner management software may include all necessary web-based tools and protocols for interfacing with users, and the dynamic tuning firmware. It is appreciated that the number of computing devices is provided for exemplary purposes only and additional devices may be used. In one embodiment, there is provided a database 24 for hosting, storing, and managing information, instructions, code, look-up tables, data files, applications, machine learning models/algorithms, hierarchical storage manager, data index tables, processing data, and other materials associated with controlling and managing cryptocurrency mining machines 16, 18, 20 and nth. Database 24 may be configured as a relational database that includes one or more tables of rows and columns that can be searched or queried according to a particular query language, such as a version of Structured Query Language (SQL). Alternatively, database 24 may be configured as a structured data store that includes data records formatted according to a markup language, such as a version of extensible Markup Language (XML). In other embodiments, database 24 may be implemented using one or more arbitrarily or minimally structured data files managed and accessible through any suitable type of application. In one embodiment, computing devices 12, 14, and/or cryptocurrency mining machines 16, 18, 20, nth directly, or indirectly communicate with database 24 via, network 22. Database 24 may also include a plurality of databases.

The system and method 10 includes one or more servers 26 for data or data file storage, management, and sharing, performing computer computations or processes, hosting software or firmware, maintaining data indexes, email communications, managing, storing and sharing digital video or audio content, managing machine learning models/algorithms, managing artificial intelligence (AI) processes, and accessing, retrieving, and transmitting data and information provided by third-party service networks. For example, in one embodiment, server 26 communicates with a digital currency exchange network 28 to access, retrieve, and transmit data and information associated with mining digital currency such as profit variables including, but not limited to, block rewards, digital coin prices, electricity price, and difficulty. It is appreciated that database 24, and server 26 may include a cloud-based services system or network that is managed by a third party entity or company. These profit variables may be accessed, retrieved, and transmitted at a predetermined interval. The system and method 10 for dynamically tuning cryptocurrency mining machines 16, 18, 20, nth may be implemented as a unified or distributed system using one or more computing devices 12, 14, and may be implemented as part of a single software or software/hardware system, or alternatively, may be partitioned in any suitable fashion into a number of distinct modules, procedures or other functional portions.

Communication network 22 provides electronic communication between computing device 12, 14, and cryptocurrency mining machines 16, 18, 20, nth, and/or with other electronic peripheral devices including for example, database 24, server 26, printers, web cams, sensors, monitors, or detectors, video systems, cameras, lights, and with IoT devices. It is understood that each computing device 12, 14, and each cryptocurrency mining machine 16, 18, 20, nth can electronically communicate with each other over the communication network 22 as well. Communication network 22 may include a wired or wireless communication network including a WLAN (wireless local area network, such as Wi-Fi (IEEE 802.11)), WPANS (wireless personal area networks, such as (IEEE 802.15), Infrared, ZigBee), WMAN (wireless metropolitan area network, such as WiMAX (IEEE 802.16)), WWAN (wireless wide area networks, internet), and GAN (global area network), a telephone network, (e.g., analog, digital, wired, wireless, PSTN, ISDN, or XDSL, a mobile wireless communication system, such as 3G, 4G, 5G, an internet-protocol based communication system, or other radio network (RF), cable network, satellite network, optical network, the internet, via Ethernet, or intranet system, LAN (Local Area Network), PAN (Personal Area Network), MAN (Metropolitan Area Network), and WAN (Wide Area Network). Communication network 22 may include a variety of communication or information exchange components or peripherals, including, but not limited to, one or more base stations, proxy servers, routers, switches, repeaters, Ethernet hubs, wired or wireless data pathways, or modems, that are configured to direct and/or deliver data and/or information.

Figure 2:
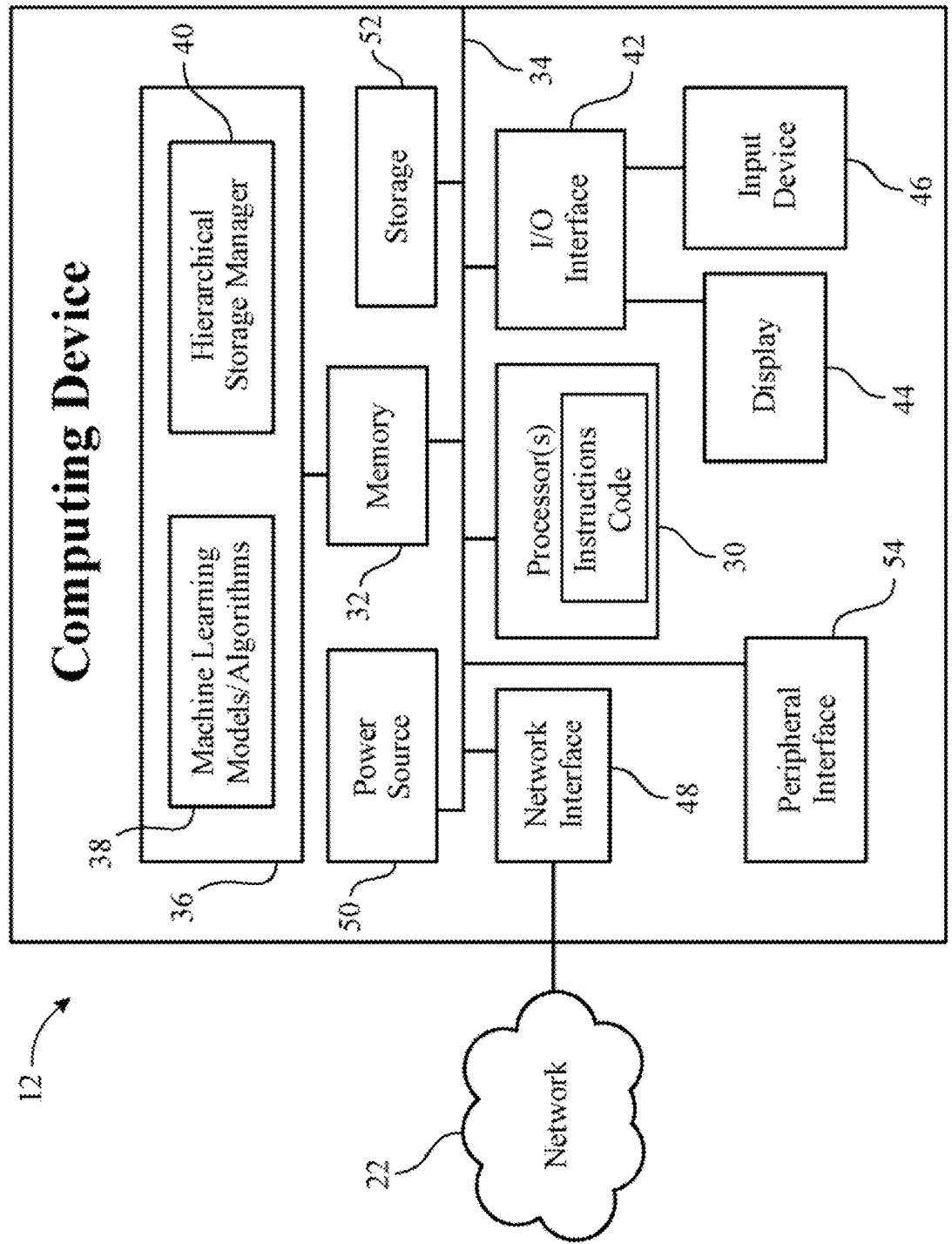
FIG. 2 illustrates a schematic block diagram of a computing device for electrically communicating with, managing, and controlling one or more cryptocurrency mining machines via, the communication network.

Turning to FIG. 2, there is shown a schematic block diagram of a computing device 12 used in controlling and managing one or more cryptocurrency mining machines 16, 18, 20, nth over the communication network 22 when mining digital currency. The functional description and operation of computing device 12 is attributed to additional computing devices. Computing device 12 includes a processor(s) 30, and memory 32 for hosting miner management software provided in a computer-executable medium, and processing the computer-executable program instructions, computer code, and computer application programs, or software to communicate with the dynamic tuning firmware for controlling, and managing each cryptocurrency mining machine 16, 18, 20, nth. Memory 32 communicates with processor(s) 30 and other components via, an electrical communication bus 34. Examples of memory 32 may include static random access memory (SRAM), synchronous dynamic RAM (SDRAM), nonvolatile/flash-type memory, machine-readable media, read only component, or any combination thereof. In one exemplary embodiment, memory 32 may include machine-executable instructions, programs, or applications 36 embodying machine learning models/algorithms 38, and hierarchical storage manager 40 that work in unison with the dynamic tuning firmware 100, shown in FIG. 4. Each computing device 12, 14 includes an I/O interface 42 electrically coupled to bus 34 for accommodating communication with a display monitor 44, and input devices 46. Examples of inputs devices 46 may include a keyboard, an electronic pen or pointer, an optical scanner, a touchpad, an electronic mouse, audio input device such as a microphone, a video capture device, or a touch screen. A network interface 48 is provided to electrically connect and communicate with communication network 22. The network interface 48 may include any network interface card including for example, an Ethernet network interface card, a wireless network interface card, or one or more modems. A power supply unit 50 provides power to electrical components. Computing device 12 may include a storage device 52 that includes a hard disk drive, a magnetic disk drive, an optical disc drive, a solid-state memory device, memory dongle, magnetic storage media, or any combination thereof. The storage device 52 can include an external storage device, such as a removable disk drive, memory stick, or flash drive that is removably attachable to computing device 12 via an electrical connector or interface. In one example, storage device 52, and memory 32 may provide volatile, and/or non-volatile storage of machine-readable instructions, data structure, program modules associated with machine learning models/algorithms 36, hierarchical storage manager 40, and dynamic tuning firmware 100. There is provided a peripheral interface 54 for accommodating peripheral output devices including printers, speakers, or visual/audible indicating devices. The peripheral interface 54 may include a serial or parallel port connection, USB or HDMI connection, or other compatible electric connections associated with peripheral devices.

Figure 3:
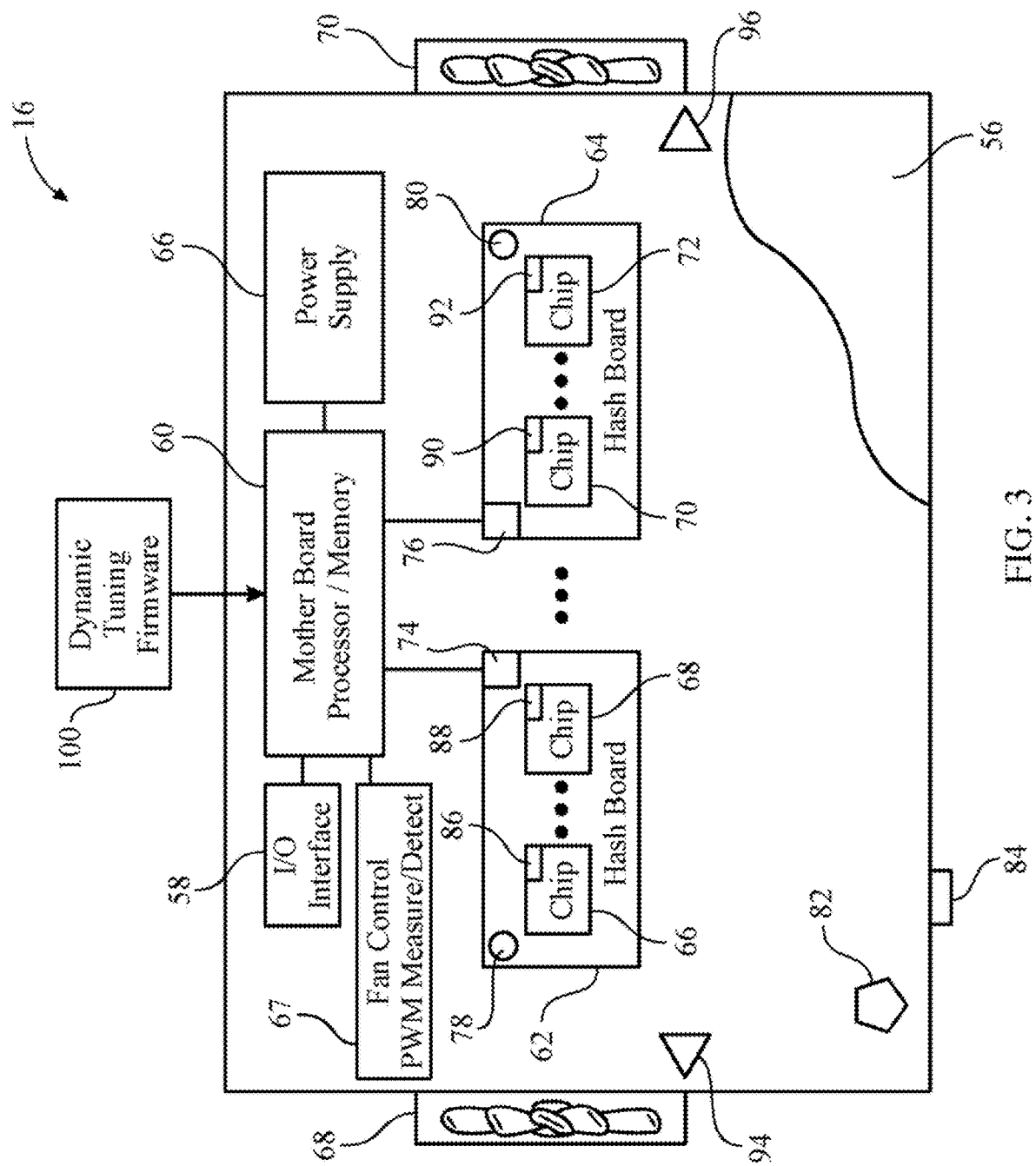
FIG. 3 illustrates a side view of a cryptocurrency mining machine showing a portion of a housing removed, to illustrate a schematic representation of functional components including a power supply, a mother board, I/O interface, hash boards including ASIC chips, cooling modules in electrical communication with a fan control module, and dynamic tuning firmware provided in a computer-readable storage medium, or non-transitory computer-readable storage medium hosted on each cryptocurrency mining machine.

Turning to FIG. 3, there is shown a side view of a cryptocurrency mining machine 16 showing a portion of a side wall 56 removed to illustrate a schematic representation of operating components. In one exemplary embodiment, each cryptocurrency mining machine 16, 18, 20, nth includes a variety of electronic components that are electrically mounted on printed circuit boards physically secured within an enclosure. Functional electronic components generally include an input/output (I/O) interface card 58 for electronically communicating with computing devices 12, 14, or with other cryptocurrency mining machines 18, 20, nth via, communication network 22. There is provided a mother board 60 including processor(s) and memory for hosting the dynamic tuning firmware 100, a plurality of hash boards 62, 64, a power supply 61 for powering the electronic components, and a cooling module including a pair of fans 68, 70 to draw heat away from electronic components including integrated circuit (IC) mining chips. In one alternative embodiment, the cooling module may employ a liquid, or gas cooling system that employs nitrogen, water, or other cooling agent to cool mining chips. Power supply 61 includes all necessary electronic circuitry and components including for example, step-down transformers, voltage regulators, filters, fuses, and other electronics for managing input power, and generating and delivering a regulated, voltage supply to electronic components. Supply voltage measuring circuitry may be provided to measure power and/or voltage delivered from the voltage power supply 61 during a start-up chip voltage phase when powering integrated circuit chips, and to alert users when voltage power supply 61 is not functioning properly. The supply voltage measuring circuitry may be selectively disabled by users.

The I/O interface 58, mother board 60, and power supply 61 can be enclosed within housing 56, or alternatively housed separately. Each hash board 62, 64 includes a predetermined number of mining chips 66, 68, 70, 72 that are particular designed for mining digital currency. It is appreciated that both the number of hash boards 62, 64, and mining chips 66, 68, 70, 72 shown are for illustrative purposes only, and that each cryptocurrency mining machine 16, 18, 20, nth may include any number of hash boards 62, 64 each having any number of mining chips. Each hash board 62, 64 includes a PIC (peripheral interface controller) denoted at 74, 76 for electrically communicating with respective mother boards 60, and mining chips 66, 68, 70, and 72 of each cryptocurrency machine.

In the preferred embodiment, each mining chip 66, 68, 70, 72 includes an application-specific integrated circuit (ASIC) chip that each include a SHA-266 algorithm for mining a specific digital currency attributed to bitcoins. ASIC chips provide smaller volume, lower power consumption, and enhanced reliability. In one alternative embodiment, ASIC chips 66, 68, 70, 72 may be replaced with field programmable gate array chips (FPGA), or Graphic Processing Unit chips (GPU), or any combination thereof. Users can program FPGA chips with different algorithms depending on the digital currency mined.

Certain condition parameters generally impact the functionality, and operating efficiency of cryptocurrency mining machine 16, 18, 20 and nth. For example, high operating temperatures may compromise the operating performance of ASIC chip 66, 68, 70, 72, and/or hash boards 62, 64, potentially causing damage if not managed properly. Each cryptocurrency mining machine includes a variety of sensors, or detectors for continuously monitoring the temperature of ASIC chip 66, 68, 70, 72, the temperature of hash boards 62, 64, the rotational direction and/or speed of fans 68, 70, the internal temperature of housing 56, the environmental temperature, or humidity, in real-time. In one embodiment, board temperature sensors 78, 80 are provided on each respective hash board 62, 64, and an inner housing temperature sensor 82 is also provided within the inner cavity of each housing 56 to measure the internal temperature of cryptocurrency mining machines. An environment temperature sensor 84 may be affixed to the external surface of each cryptocurrency mining machine 16, 18, 20 nth for measuring environmental temperature in which the mining machines operate. On-chip temperature sensors 86, 88, 90, 92 are also provided to measure the temperature of each ASIC chip at start-up, and during operation. Each on-chip temperature sensor 86, 88, 90, 92 may include miniature thermocouples, resistance temperature detectors, thermistors, or other semi-conductor based integrated circuits. It is appreciated that any number of temperature sensors or detectors can be implemented to measure various temperatures, or other characteristics such as humidity associated with cryptocurrency mining machine 16, 18, 20 and nth. For example, fan sensors 94, 96 are provided to measure, or detect the rotational speed of the fans. Such fan sensors 94, 96 may include encoders, motion detectors, or voltage/current circuitry. Sensors 94, 96 electrically communicate with a fan control module 67 that is in communication with mother board 60. The fan control module 67 includes pulse width modification measuring and detecting circuitry. The fan control module 67 monitors, measures, and dynamically controls the speed of fans 68, 70 to manage the temperature of ASIC chip 66, 68, 70, 72, and/or hash board 62, 64 to prevent damage, and overheating. Sensors 78, 80, 82, 84, 86, 88, 90, 92, 94, 96 are all in electrical communication with mother board 60 as well for managing control of fans 68, and 70 via, fan control module 67.

Figure 4:
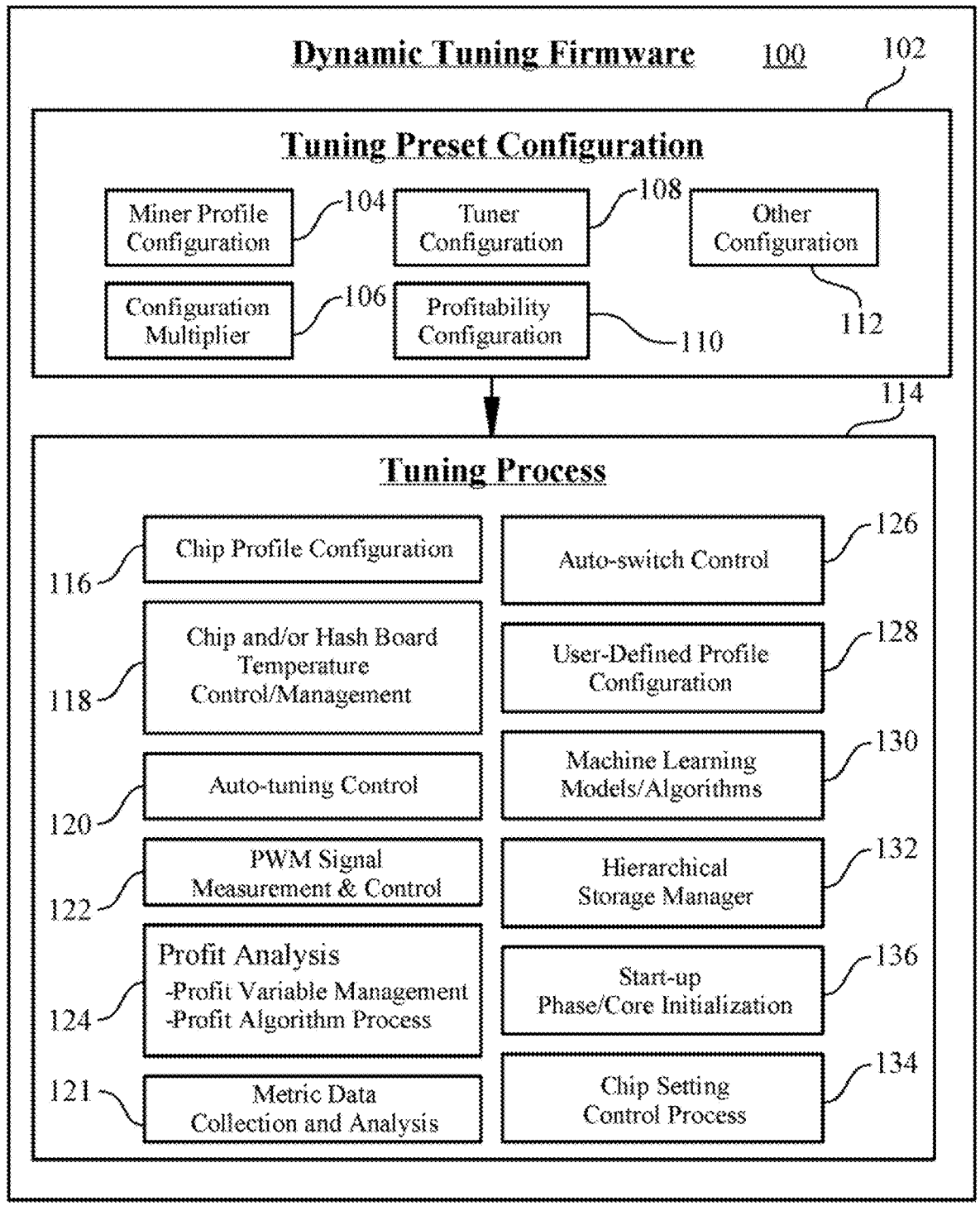
FIG. 4 illustrates a block diagram of the dynamic tuning firmware showing a tuning preset configuration block in functional communication with a tuning process block that operate in unison for auto-tuning cryptocurrency mining machines.

Turning now to FIG. 4, there is provided a block diagram of a dynamic tuning firmware 100 including software, instructions, computer code, application(s) and/or program (s) for effectively and efficiently controlling and managing the operation of ASIC chips 86, 88, 90, 92, and various functionalities of each cryptocurrency mining machine 16, 18, 20, nth when mining digital currency. The dynamic tuning firmware 100 includes a tuning preset configuration block 102 in functional communication with a tuning process block denoted at 114. The tuning preset configuration block 102 provides users with selectable interface configurations to preconfigure various operational parameters including chip profile configurations, user-defined profile configurations, target chip temperatures, and profit analysis and variables, and for selectively disabling, or enabling certain modes of operation affiliated with each cryptocurrency mining machine. The tuning preset configuration provides a miner profile configuration 104 for generating a miner profile configuration screen to preset or preconfigure chip profile configurations, and target chip temperatures; a configuration multiplier 106 for generating a configuration multiplier screen to preset or preconfigure chip profile configurations and target chip temperatures for a plurality of cryptocurrency mining machines simultaneously; a tuner configuration 108 for generating a tuner configuration screen to manually preset or preconfigure user-defined chip profile configurations; a profitability configuration 110 for generating a profit configuration screen to preset profit variables used in determining mining profit, and other configuration 112 associated with generating other interactive screens for managing other functionalities of the dynamic tuning firmware 100. The tuning process block 114 includes various processes and functionalities associated with controlling and managing cryptocurrency mining machines 16, 18, 20, nth, and more particularly, controlling and managing the operation of ASIC chips 86, 88, 90, 92, and other electronic components. In one non-limiting embodiment, the tuning process block 114 includes a preset chip profile configuration 116 providing a plurality of preset chip profile configurations that are predefined and stored for use. Each preset, chip profile configuration includes, inter alia, a voltage profile range including a maximum and minimum chip voltage, and a frequency profile range including a maximum and minimum chip frequency; a chip and/or hash board temperature control/management 118 that electrically communicates with mother board 60 via, PIC 74, 75 to control fans 68, 70 for managing the operating temperature of ASIC chips, and/or hash boards; auto-tuning control 120 for dynamically adjusting voltages, and frequencies associated with the voltage and frequency profile range, respectively, to determine tuned parameters including a target chip voltage, and target chip frequency to provide efficient power usage, and optimal hash rate when applied to ASIC chips; a metric data collection and analysis block 121 for collecting, monitoring, processing, managing, analyzing, and storing various performance metric data or information used during auto-tuning; a profit analysis process 124 including profit variable management (in an exemplary embodiment, profit variable management may include establishing communication with an external device such as server 26 and/or digital currency exchange network 28 via an external network such as network 22, and then retrieving at least one profit variable from the external device) associated with mining digital currency, and a profit algorithm that employs the profit variables (in an exemplary embodiment, this may include calculating an estimated profitability of a mining chip based on one or more profit variables) to apply tuned parameters that provide the highest profit to ASIC chips (in an exemplary embodiment, this may include adjusting a chip voltage supplied to a mining chip and/or adjusting a chip frequency of a mining chip in order to maximize the estimated profitability); an auto-switch control 126 that operates to selectively switch between chip profile configurations based on various condition parameters to find tuned parameters; a preset user-defined profile configuration 128 for users to manually preset user-defined chip profile configurations; a machine learning models/algorithms 130 for applying machine learning models/algorithms during the auto-tuning process to learn a plurality of tuned parameters associated with chip profile configurations; a hierarchical storage manager 132 optionally employed to store and classify learned tuned parameters according to certain rules or policies; a chip setting process 134; and a start-up phase and core initialization process 136 for powering on the ASIC chips and other electronic components, and initializing the chip cores to begin auto-tuning. It is appreciated that other dynamic tuning processes associated with controlling and managing cryptocurrency mining machines 16, 18, 20, nth may be provided in tuning process block 114. For example, additional tuning processes may include configuration and functionality of peripheral interface controllers (PIC), updating features associated with firmware, machine learning, or miner management software.

In a preferred embodiment, the dynamic tuning firmware 100 is stored in a machine-readable executable medium, or a non-transitory machine-readable executable medium hosted in memory of mother board 60 provided on each cryptocurrency mining machine 16, 18, 20, and nth, as illustrated in FIG. 3. Alternatively, the dynamic tuning firmware 100 may be hosted on computing devices 12, 14, or on a cloud-based system where cryptocurrency mining machines can access, and retrieve various functionalities or processes associated with the dynamic tuning firmware programs, computer code, and instructions, via, communication network 22. The dynamic tuning firmware 100 provides the necessary program user-interfaces (e.g. interface screens) needed for users to communicate, interact, manage, control, and exchange information with cryptocurrency mining machine 16, 18, 20 and nth. In one non-limiting embodiment, the user-interface may include a graphical user interface, a software interface, a hardware interface, or any combination thereof for enabling users to view, edit, change, add, create, manipulate, input, save or store, print, command, submit, transfer, manage, navigate, and import/export, any and all data, information, bits, values, elements, figures, symbols, characters, terms, numbers, or graphs, associated with cryptocurrency mining machines 16, 18, 20, nth. It is appreciated that interface screen generated by the tuning preset configurations 104, 106, 108, 110, 112 may include any number of screens each including any number of icons, banners, drop down menus, entry boxes, designated inputs, check boxes, tabs, inserts, pop-ups, query boxes, rows or columns of data or information, libraries, spreadsheets, expandable windows, scrolls, tables, menus, and other designed formats or configurations to permit users to view, modify, enter and remove data, information, values, digits, bars, charts, colors, or percentage values.

Users access and communicate with each cryptocurrency mining machine 16, 18, 20, nth via, computing device 12, 14 over the communication network 22. Users can access each designated cryptocurrency mining machine directly without authentication, or alternatively, through user authentication protocols. To gain direct access to each cryptocurrency mining machine 16, 18, 20, nth, users enter an IP address, associated with each designated cryptocurrency mining machine, in an address bar of a control program (e.g. browser) provided on each computing device 12, 14. Upon entering the IP address, users are presented with an interface home screen of the dynamic tuning firmware 100. In an alternative embodiment, users enter a uniform resource locator (URL) in the address bar of the control program to gain access to a log-in page that requires user-authentication. The log-in page functionally supports authentication/access protocols including a single or multi-tiered authentication process protocol. In general, a user may perform authentication based on various factors including for example, username, password, passphrase, PIN, secret question, secret answer, or possession of a machine readable secret data such as encryption key, or via, biometric attributes such as fingerprint, palm, voice characteristics, or iris pattern. In one example, users enter a user name, and password to satisfy the authentication protocol to gain access to tuning preset configuration screens provided in the tuning preset configuration block 102, of FIG. 4. In one embodiment, the authentication protocol may generate a security code that is submitted to a user's smartphone, via, a SMS text, to confirm the identity of the user.

Figure 5:
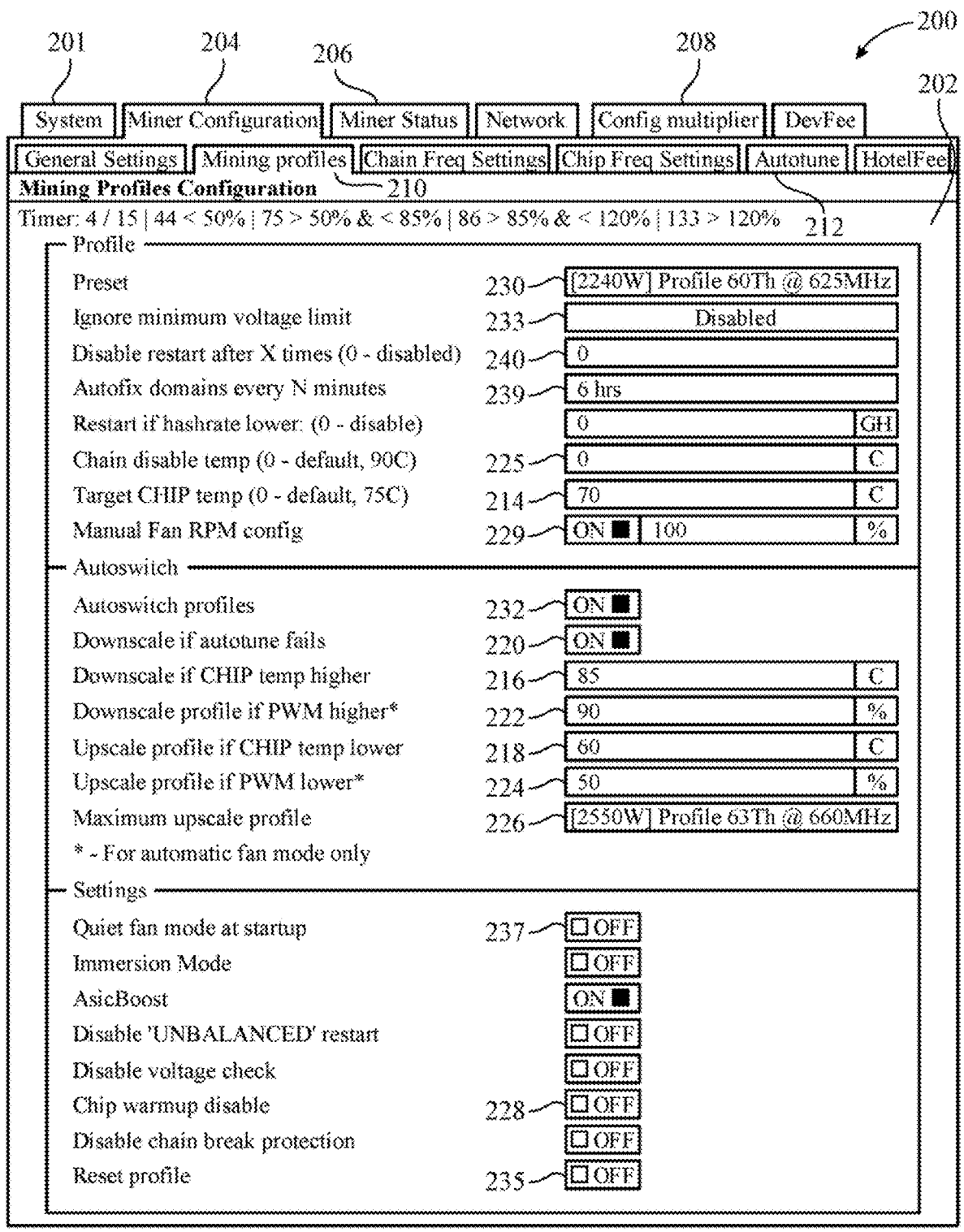
FIGS. 5 and 6 illustrate a miner profile configuration screen for managing operational parameters of a designated mining machine, including a drop down menu for selecting various profile configurations, presetting target chip temperature values, and operating speed of cooling modules, and a selective operator for enabling an auto-switch mode for auto-tuning the designated cryptocurrency mining machine.

Turning now to FIG. 5, there is shown a mining profile configuration screen provided via, the miner profile configuration 104 of the dynamic tuning firmware. The mining profile configuration screen provides a dashboard 200 of function tabs that correspond to a plurality of sub-function tabs each associated with a user interface screen. In one example, function tabs include a system tab 201, a miner configuration tab 204, a miner status tab 206, and a configuration multiplier tab 208. Upon selecting the miner configuration 204 function tab from dashboard 200, there is presented a plurality of sub-function tabs including, in one non-limiting example, general settings, mining profiles 210, chain (hash board) frequency settings, ASIC chip frequency settings, auto-tune 212, and hotel/fee. In selecting sub-function tab 210, the dynamic tuning firmware initiates instructions or computer code to generate a mining profile configuration screen 202 used to preset or preconfigure chip profile configurations, target chip temperature values and settings, and enable various modes of operation including an auto-switch mode 232, a soft-start mode 237, and a chip warmup mode 228.

Figure 6:
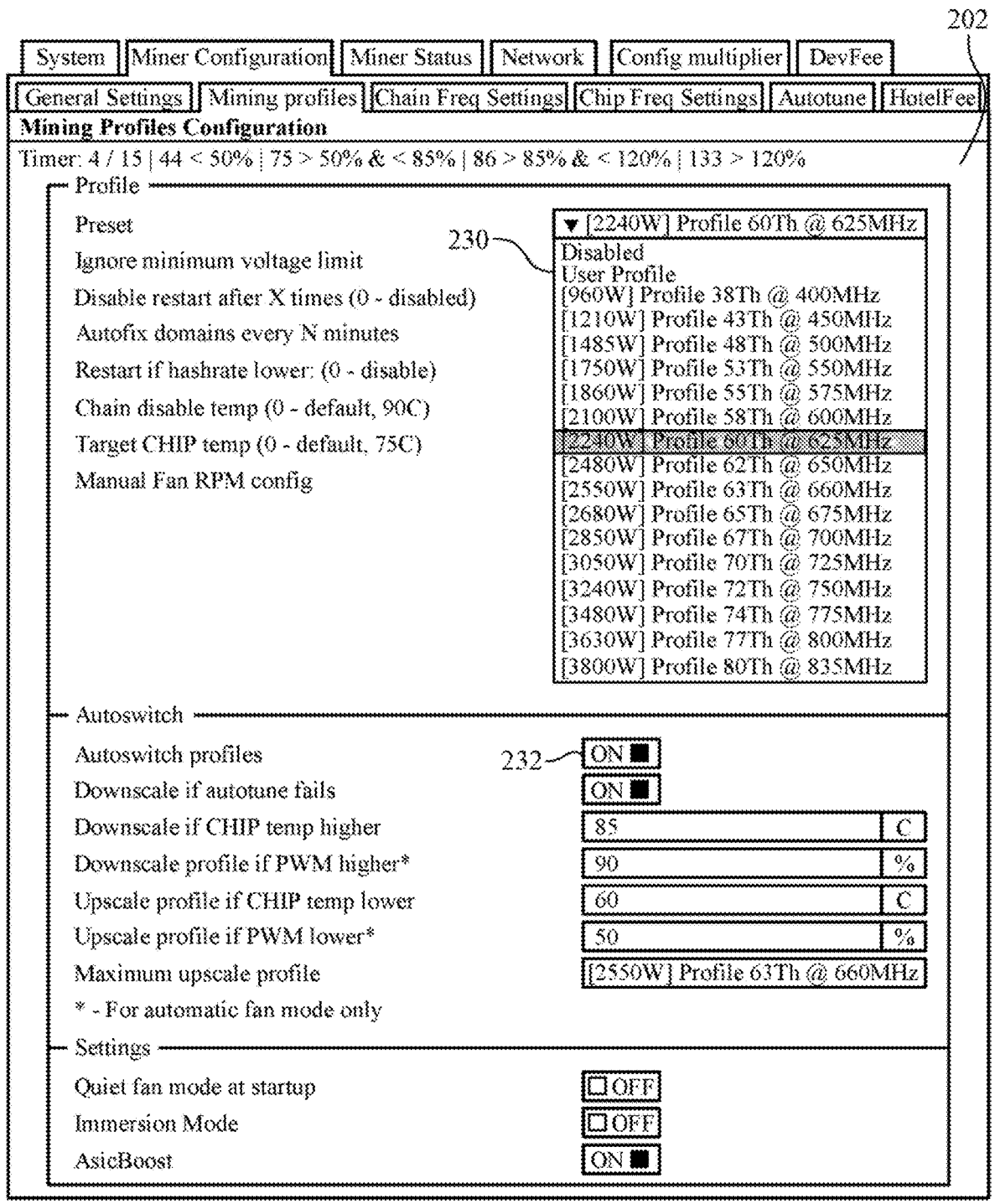

Instructions, and computer code of the dynamic tuning firmware 100 initiates an auto-tuning process 120 to process selectable chip profile configurations provided at 116, or user-defined profile configurations provided at 128 of FIG. 4, to dynamically adjust voltages and frequencies provided in the voltage and frequency profile range, respectively, associated with chip profile configurations to find a tuned parameters that when applied to the ASIC chips 66, 68, 70, 72 provide low power consumption, and high hashrate values to effectively and efficiently operate cryptocurrency mining machines 16, 18, 20, nth when mining digital currency. Each chip profile configuration is preset or predetermined in advance, and stored. A plurality of chip profile configurations are provided via, drop down menu 230, as shown in FIGS. 5 and 6. The plurality of chip profile configurations are initially determined during a chip profile set-up phase based on chip manufacturing specifications, and other factors where chip voltages, and chip frequencies are applied to ASIC chips 66, 68, 70, 72 of cryptocurrency mining machines, over an x number of times, to find voltage profile ranges that provide efficient power usage values, and frequency profile ranges that provide optimal hashrate values when applied to ASIC chips. Each voltage profile range includes a maximum chip voltage, and a minimum chip voltage, a frequency profile range that includes a maximum chip frequency, and a minimum chip frequency, a voltage increment or decrement value, and a tuning cycle. During an auto-tuning process, the voltage and frequency values provided in each voltage and frequency profile range associated with each selected chip profile configuration, are dynamically adjusted until a target chip voltage, and target chip frequency that provides the lowest power consumption at the highest chip hashrate is found. Auto-tuning adjusts the chip voltage, and chip frequency, of each profile range, to determine a target chip voltage, and target chip frequency that provides for low power usage, and optimal hashrate to optimally manage chip temperature and operating costs, and to garner the highest profits. The consumed power usage, and hashrate value associated with each target chip voltage, and target chip frequency can be measured in real-time using electronic circuitry, IC's, or electronic modules. Alternatively, the consumed power usage, and hashrate values of each ASIC chip can be calculated using specific, mathematical equations or algorithms.

In one embodiment, each chip profile configuration is assigned a profile identifier for categorizing chip profile configurations according to increasing or decreasing voltage, and frequency values provided in each voltage and frequency profile range, or increasing and decreasing power usage value in watts. For example, a profile identifier 53 may include a power usage of 2160 watts, a maximum chip voltage of 18 volts, a minimum chip voltage of 5 volts, a maximum chip frequency of 660 MHz, a minimum chip frequency of 180 MHz, a voltage increment or decrement value of 0.1 volts, and a tuning cycle of 5. A profile identifier 57 may include a power usage of 2660 watts, a maximum chip voltage of 23 volts, a minimum chip voltage of 8 volts, a maximum chip frequency of 700 MHz, a minimum chip frequency of 300 MHz, a voltage increment or decrement value of 0.2 volts, and a tuning cycle of 7. As illustrated in FIG. 5, a reset profile operator 235 allows users to clear previously stored chip profile configurations from memory. In one embodiment, enabling the reset profile operator 235 may provide a reset profile screen (not shown) for users to preset dates, and/or times at which all, or a selected number of, chip profile configurations are cleared from memory.

In embodiment, each chip or user-defined profile configuration may include solely a wattage value that is selectively retrieved during auto-tuning to determine target chip voltages, and target chip frequencies that provide for the lowest power consumption at the highest hashrate for mining digital currency. For example, each wattage value may include a predetermined voltage and frequency profile range employed during auto-tuning to determine tuned parameters. Each chip profile configuration including a wattage value may be assigned a profile identifier such as a numeric number, or alphabet letter, for categorizing wattage values according to increasing or decreasing wattage values. For instance, a wattage value of 1500 watts may be assigned a profile identifier as a number of 50, where as a wattage value of 2000 watts is assigned a higher profile identifier as number 52. Thus, drop down menu 230 may include solely wattage values, numeric numbers associated with wattage values, or both. In another embodiment, each profile configuration may include terahash values associated with predetermined voltage and frequency profile ranges employed during auto-tuning to determine tuned parameters.

Dynamically adjusting chip voltages, and chip frequencies provided in the voltage and frequency profile ranges to optimize the performance of ASIC chips 66, 68, 70, 72 is based on various condition parameters including temperature. Managing chip temperature is important to prevent damage, and instability of ASIC chips while maintaining the efficient operation of cryptocurrency mining machine 16, 18, 20, and nth. Managing the temperature of the ASIC chips is a function of the chip and/or hash board temperature control and management functionality 118 of the tuning process 114 as provided by the dynamic tuning firmware 100 in FIG. 4. As provided in the mining profile configuration screen 202, shown in FIG. 5, chip temperature ranges are preset by users in advance. Upon presetting chip temperature ranges, a target chip temperature value (given in a range of 0 to 75 C in one example) is entered in designated box 214, a maximum (downscale) chip temperature value is provided in designated box 216, and a minimum (upscale) chip temperature value is entered in box 218. In one example, there is provided a target chip temperature of 70 degrees for identifying an ideal operating temperature of the ASIC chips, a maximum chip temperature of 85 degrees, and a minimum chip temperature of 60 degrees at which the ASIC chips are to operate. To effectuate such settings, there is provided on-chip temperature sensors 86, 88, 90, 92 to continuously measure the operating temperature of each ASIC chip 66, 68, 70, 72, and generate electrical signals corresponding to the measured chip temperatures. The generated electrical signals are transmitted to mother board 60 for analyzing and processing via, PIC 74, 76. Mother board 60 electrically communicates with fan control module 67 to control the operating speed of fans 68, 70 of each cryptocurrency mining machine 16, 18, 20, nth, to cool ASIC chips 66, 68, 70, and 72. Fans 68, 70 are controlled to forcibly circulate the air, and draw heat away from the ASIC chips to regulate and manage chip temperature. If the measured chip temperature of one or more ASIC chips exceeds a maximum chip temperature preset at 216, the measured data is processed by the mother board 60, and the mother board 60 subsequently delivers a control signal to fan control module 67 to increase the pulse width modification (PWM) for increasing the rotational speed of fans 68, 70 forcibly drawing heat away from the ASIC chips 66, 68, 70 and 72. However, if the temperature of one or more ASIC chips falls below a minimum (upscale) chip temperature provided in 218, the mother board 60 delivers a control signal to fan control module 67 to decrease PWM of fans 68, 70 which decreases the rotational speed of fans 68, 70 to save power as a result of the ASIC chips producing less heat. Rotational speed sensors 94, 96 are provided to measure the rotational speed, and/or direction of fans 68, 70. Fan control 67 includes a PWM detecting and measuring circuit or module to detect, measure and control the pulse width modification signal delivered to fans 68 and 70.

In certain environment, colder temperatures may affect the performance of ASIC chips 66, 68, 70, 72, and compromise the operation of cryptocurrency mining machine 16, 18, 20, and nth. For example, cryptocurrency mining machines 16, 18, 20, nth may operate in colder environments where the temperature of ASIC chips fall below normal temperature ranges. To overcome colder temperatures, each cryptocurrency mining machine 16, 18, 20, nth is configured to initiate a chip warm-up cycle for warming the ASIC chips 66, 68, 70, and 72 to acceptable temperature levels before operating to full capacity. When enabling the chip warm-up cycle via, 228 in FIG. 5, a predetermined chip voltage supplied by the power supply 61, is delivered to the ASIC chips. In one exemplary embodiment, the chip warm-up signal may include a dc voltage including a constant predetermined voltage, a voltage based on a predetermined duty cycle, or a voltage that gradually increases in value until reaching a maximum value. The chip warm-up signal may range from 0.1 volts to 5 volts dc. A graphical visual or audible indicator may be implemented via, the dynamic tuning firmware and/or via hardware, or a hardware visual or audible indicator such as light emitting diodes, or buzzers, may be implemented, to alert users when the proper warm-up temperature of each ASIC chip 66, 68, 70, 72 has been reached. The on-chip temperature sensors 86, 88, 90, 92 inform the mother board 60 when the appropriate chip temperature has been reached, via PIC 74, and 76. It is appreciated that the chip warm-up cycle can be disabled by users when cryptocurrency mining machines are operating in warmer climates. In one embodiment, the chip warm-up cycle may be accomplished by using one or more miniature, electric heaters disposed on, or adjacent to, each ASIC chip, or located within the internal cavity housing 56 of each cryptocurrency mining machine. The electrical heaters can be controlled by PIC 74, 76 via, mother board 60 of each cryptocurrency mining machine.

With continued reference to the mining profile configuration screen shown in FIG. 5, there is provided additional settings for dynamically tuning each cryptocurrency mining machine that include: downscale if auto-tune fails function 220 where if the cryptocurrency mining machine 16, 18, 20, nth fails to auto-tune correctly based on a predefined tuning cycle, the auto-switch feature of each cryptocurrency mining machine will selectively switch to another chip profile configuration in an effort to find tuned chip parameters that provide for low power consumption, at a high hashrate; a downscale if chip temperature and/or hash board temperature is higher function 216 where if the chip temperature and/or hash board temperature is higher than the maximum chip temperature value chip, the auto-switch feature of each cryptocurrency mining machine 16, 18, 20, nth selectively switches between chip profile configurations to find tuned parameters (the target chip voltage, and target chip frequency) needed to manage temperatures closer to the preconfigured target chip temperature value provided: a downscale profile if PWM (pulse width modification) is higher function 222, where if automatic fan control is activated to regulate chip temperature of ASIC chip 66, 68, 70, 72, and the speed of one or both fans 68, 70 is operating over an x %, for example over 90%, the cryptocurrency mining machine 16, 18, 20, nth the auto-switch feature allows each cryptocurrency mining machine to selectively switch between chip profile configurations to tuned parameters that provide lower power consumption at the highest hashrate when applied to the ASIC chips to manage chip temperature, and correspondingly increase the PWM to increase fan speed; an upscale profile if chip temperature and/or hash board temperature lower function 218, where if the chip temperature and/or hash board temperature is lower than a minimum chip and/or hash board temperature, the cryptocurrency mining machine 16, 18, 20, nth selectively or automatically switches between chip profile configurations to find tuned parameters that provide a higher hashrate to mine more aggressively under cooler temperatures, while managing power consumption; an upscale profile if PWM is lower function 224, where if automatic fan control is activated to regulate temperature of ASIC chip 66, 68, 70, 72, and the speed of one or both fans 68, 70 is lower than x %, for example lower than 18%, the cryptocurrency mining machine 16, 18, 20, nth will automatically switch between chip profile configurations to find tuned parameters that provide a higher power usage and an increased hashrate, where fan control module 67 may gradually increase the PWM to gradually increase the speed of fans 68, 70 as the increase in power usage and hashrate begins to generate an increase in chip temperature; and a maximum upscale profile function 226 which represents a maximum chip profile configuration, or maximum chip voltage, and/or chip frequency that the cryptocurrency mining machine 16, 18, 20, nth will operate at. So if cryptocurrency mining machine 16, 18, 20, nth are operating in a cold environment, the maximum upscale profile places a limit on the amount of power consumed by ASIC chips. This feature is useful in situations where there may not be enough power available by the power supply thus preventing the cryptocurrency mining machine 16, 18, 20, nth from demanding too much power and possibly preventing tripping of power circuit breakers when operating in cooler temperatures.

Figure 7:
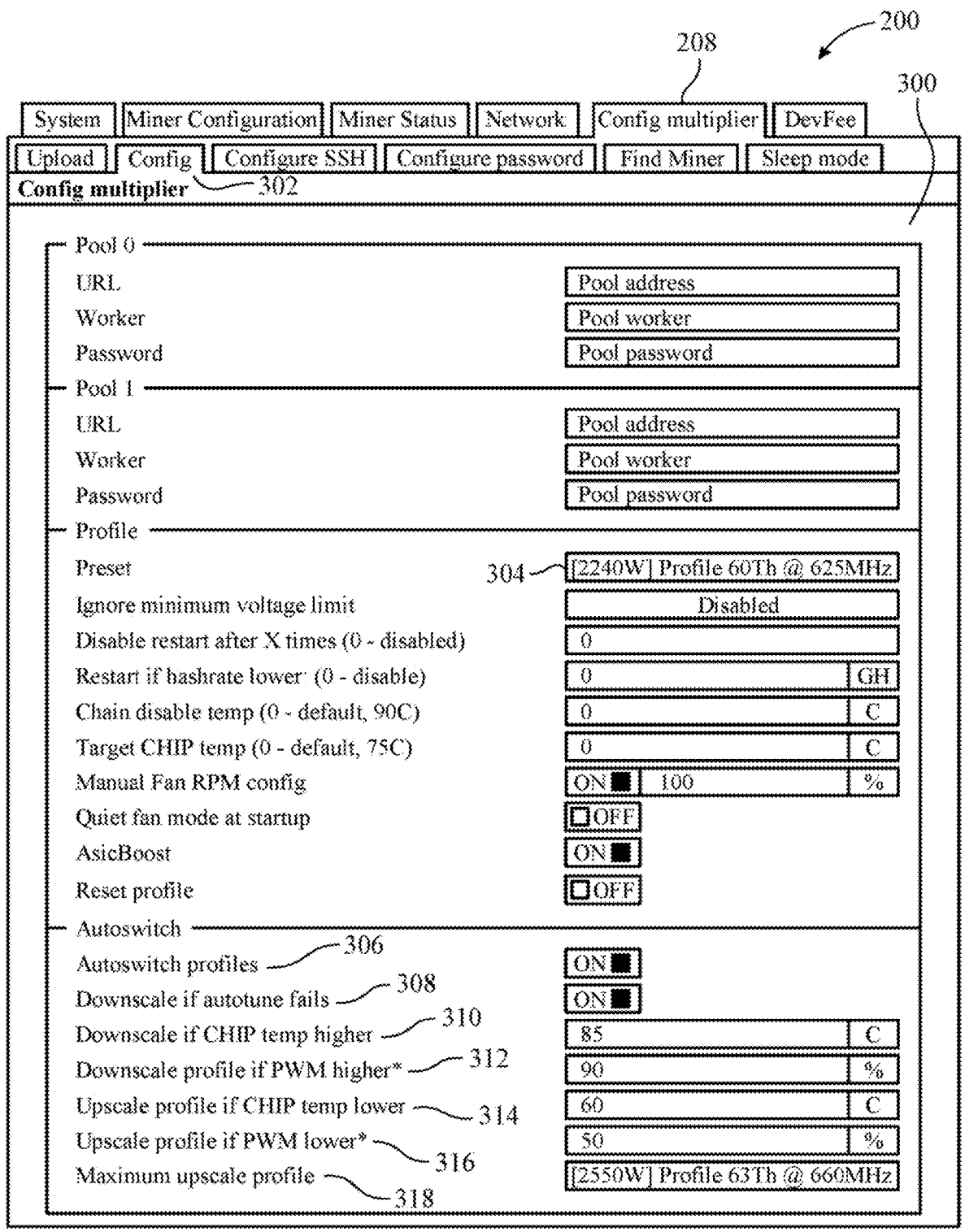
FIG. 7 illustrates a configuration multiplier screen for managing operational parameters of a plurality of designated mining machines, including a drop down menu for selecting various profile configurations, presetting target chip temperature values, and operating speed of cooling modules, and a selective operator for enabling an auto-switch mode for auto-tuning the plurality of designated cryptocurrency mining machines simultaneously.

Instructions and/or computer code of the dynamic tuning firmware 100 initiates operation of the auto-switch process 126 for auto-tuning the cryptocurrency mining machines. When auto-switch is enabled, auto-tuning selectively switches between chip profile configurations provided in drop down menu 230 to dynamically adjust the chip voltage and chip frequency associated with each voltage and frequency profile range to determine the optimal target chip voltage and target chip frequency need to effectively manage power usage, and optimal performance of ASIC chips. To save time, and effort, auto-switch is configured for multiple cryptocurrency simultaneously, eliminating the need to preconfigure each machine separately. As shown in FIG. 7, through dashboard 200, users select a configuration multiplier function tab 208, and a sub-function configuration tab 302 to access a configuration multiplier screen generally denoted at 300. A drop down menu 304 similar to drop down menu 230, provides a plurality of chip profile configurations for initially selecting a chip profile configuration. After selecting a chip profile configuration from the drop down menu 304, users enable the auto-switch mode 306. The configuration multiplier screen 300 also provides additional settings for managing and controlling multiple cryptocurrency mining machines 16, 18, 20, nth similar to those in FIG. 5. Such additional settings include: downscale if auto-switch fails function 308, downscale if chip temperature and/or hash board temperature is higher function 310, downscale profile if PWM (pulse width modification) is higher function 312, upscale profile if chip temperature and/or hash board temperature lower function 314, upscale profile if PWM is lower function 316, and a maximum upscale profile function 318 which represents the maximum chip profile configuration.

Figure 8:
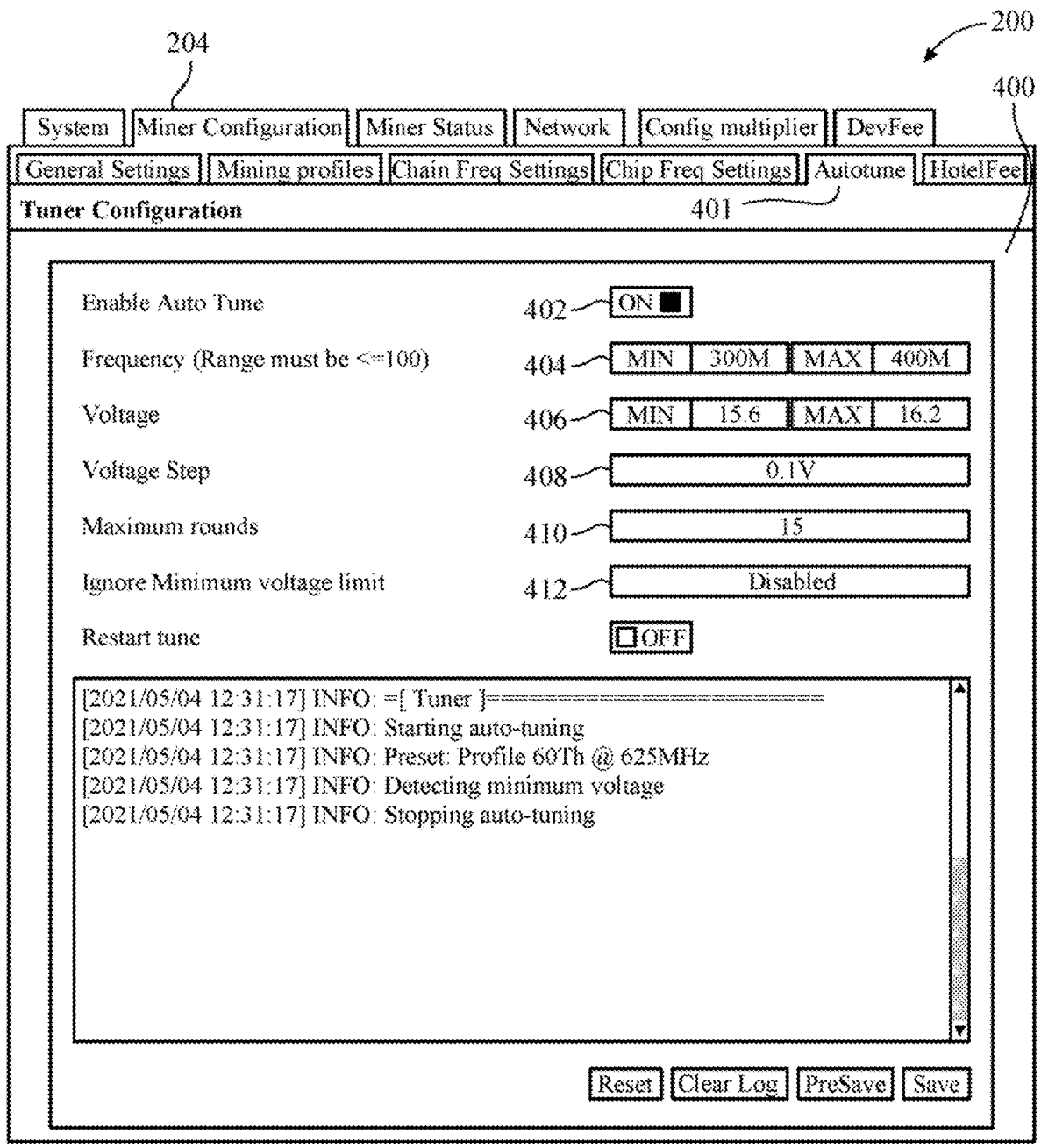
FIG. 8 illustrates a tuner configuration screen for managing user-defined chip profile configurations for auto-tuning a designated cryptocurrency mining machine.

Referring to FIG. 8, users may enter user-defined profile configurations rather than employ preset chip profile configurations as provided in the drop down menu 230 in FIG. 5. The user-defined profile configuration functionality 128 of the dynamic tuning firmware 100 generates an interface tuner configuration screen 400 when initiated by users. To initiate access to the tuner configuration screen 400, users initiate the function tab denoted miner configuration 204 from dashboard 200, and initiate the associated sub-function auto-tune tab 412 instructing the dynamic tuning firmware to provide the tuner configuration screen 400. It is noted that when selecting the user profile operative from drop down menu 230, the auto-switch profile 232 is automatically disabled since the user-defined chip profile configuration includes a single configuration arrangement and auto-switching between different profile configurations is not configured. Tuner configuration screen 400 provides an auto-tune mode operator 402 to initiate auto-tuning of the preconfigured user-defined profile configuration for auto-tuning one or more designated cryptocurrency mining machines. A user-defined profile configuration is configured in each designated entry including a frequency range profile 404 having a maximum and minimum chip frequency, a voltage range profile 406 having a maximum and minimum chip voltage, a voltage increment or decrement value 408, and a tuning cycle 410. It is appreciated that the values provided in the user-defined profile configuration may include the same or different values provided in the chip profile configurations. Tuner configuration screen 400 may provide one or more drop down menus that include a plurality of predefined user-defined voltage and frequency profile ranges. As shown in FIG. 8, tuner configuration screen 400 includes an operative entitled, ignore minimum voltage limit 412 which instructs auto-tuning to ignore the minimum voltage provided in the voltage profile range and to determine a lower target chip voltage in the event chip instability has not yet been determined during the core initialization process.

After configuring each designated cryptocurrency mining machine 16, 18, 20, nth by either enabling auto-switch and selecting a chip profile configuration, or by selecting user profile for disabling auto-switch mode and manually entering a user-defined profile configuration, each cryptocurrency mining machine 16, 18, 20, nth is then subsequently powered-on during a start-up phase which is supported by the start-up phase/core initialization process at 136 of the dynamic tuning firmware, as shown in FIG. 4. During the start-up phase, the mother board 60, of each cryptocurrency mining machine 16, 18, 20, nth, initiates an initial status check to determine the operational status of the cooling module, i.e. fans 68, 70, the temperature of ASIC chips, and/or hash boards, and the operational status of some or all of sensors 78, 80, 82, 84, 86, 88, 90, 92, 94 and 96. In one embodiment, the status check process checks the operational status of fans 68, 70 if enabled, by either detecting and/or measuring the electrical pulse width modification (PWM) signals delivered to the fans 68, 70, via, fan control 67, or by monitoring the rotational speed of the fans 68, 70, via sensors 94, 96. It is appreciated that during the start-up phase, each cryptocurrency mining machine 16, 18, 20, nth may begin a soft-start process where the rotational speed of the fan 68, 70 is increased gradually over a predetermined time period until reaching a maximum speed. The soft-start process is enabled by users at 237 in FIG. 5. If during the status check, fans 68, 70 are found inoperative, the start-up phase is terminated, and users are alerted via, a hardware and/or software indicator. It is appreciated that the start-up phase may initiate a status check for other types of cooling modules or systems as well including for example, checking the level and/or flow of a coolant, or gas such as nitrogen gas, checking on the operation of a refrigerant system, or the operation of electric cooling devices such as Peltier cooling devices. The status check phase also checks or measures the temperature of ASIC chip 66, 68, 70, 72 and/or hash board 62, 64 via, and the operational status of on-chip temperature sensors 86, 88, 90, 92, and/or PCB temperature sensors 78, and 80. If for example, the chip temperature of one or more ASIC chips, and/or the temperature of either or both hash boards, falls below, or above a predetermined temperature range, or if a chip temperature is deemed to be too low as a result of operating in a cold environment, cryptocurrency mining machine 16, 18, 20, nth begins a temperature cool-down process to lower the temperature, or a chip warm-up cycle to warm-up the ASIC chips until reaching a predefined target or threshold chip temperature. In one embodiment, there may be provided a sensor operator for users to enable or disable the status check of some or all components including the temperature sensors. In another embodiment, the selector operator may provide a drop down menu where users can select the components that are needed to be checked during the status check process of the start-up phase. Once the status check phase is completed, a core initialization process begins.

Through instructions, and/or computer code provided by the core initialization process 136 of the dynamic tuning firmware 100, electrical communication is initiated between mother board 60, power supply 61, and PIC 74, 76 to deliver a low chip frequency of approx. 5 MHz, and a start-up chip voltage to all ASIC chips 66, 68, 70, 72. During core initialization, the start-up chip voltage delivered to the ASIC chips is gradually increased, over a predetermined time, to prevent damage to, and instability of, ASIC chips 66, 68, 70, 72 until reaching a maximum operating chip voltage. Alternatively, the start-up chip voltage can be rapidly increased until reaching the maximum operating chip voltage in a shorter time period. The maximum operating chip voltage is defined as an initial power value calculated from the number of voltage domains. For example, each cryptocurrency mining machine 16, 18, 20, nth may have 12 voltage domains where an initial voltage for each ASIC chip is approximately 1.75 volts resulting in a maximum operating chip voltage of 12 times 1.75 volts=21 volts, Thus, during core initialization, the start-up chip voltage is gradually, or rapidly increased to 21 volts.

Once the maximum operating chip voltage for a given chip frequency range is reached, the core initialization process initiates a function status sequence to determine operation, and electrical communication response of each ASIC chip 66, 68, 70, 72 and/or hash board 62 and 64. The function status sequence undergoes an evaluation process which measures, calculates, analyzes and/or monitors any of: clock speed (hashrate), maximum operating chip voltage, maximum chip frequency, and chip temperature via, on-chip temperature sensors 86, 88, 90, 92. If during the function status sequence one or more ASIC chips are found to function poorly, the associated cryptocurrency mining machine 16, 18, 20, nth re-initiates a core initiation process on the poorly functioning ASIC chips in an effort to improve performance. The core initiation process may occur over an x number of times such as 5 times, or over an x time period such as every 2 minutes, or 15 minutes. If after a predefined number of times, or period of time, some ASIC chips 66, 68, 70, 72 are still found to function poorly, the hash board 62, 64 associated with the non-functional ASIC chips is disabled, and the core initiation process continues analyzing other ASIC chips until the functional status sequence of all ASIC chips and/or hash boards is completed. It is understood that in one embodiment, an x number, or group of ASIC chips 66, 68, 70, 72 may be functioning poorly before the core initiation process is re-initiated, or terminated. For example, in one scenario, core initiation process may be terminated only if it is determined that a hash board 62 includes 5, 10, or 15 ASIC chips that are functioning poorly. After verifying functionality of each ASIC chip 66, 68, 70, 72, and/or hash board 62, 64, the maximum operating chip voltage of each ASIC chip is adjusted, via a predetermined voltage value, to reach the maximum chip voltage provided in the voltage profile range of the selected chip profile configuration, or user-defined profile configuration. Subsequently, the low chip frequency is subsequently increased gradually, a predefined frequency value, to reach a maximum chip frequency provided in the frequency profile range of the selected chip profile configuration, or user-defined profile configuration. Alternatively, the low operating chip frequency can be increased rapidly to reach the maximum chip frequency within a shorter time period. Once the maximum chip voltage, and maximum chip frequency are set for each ASIC chip 66, 68, 70, 72, the core initiation process terminates, and auto-tuning each cryptocurrency mining machine begins.

Auto-tuning optimizes the performance of ASIC chips 66, 68, 70, 72 by dynamically adjusting the chip voltage, and chip frequency provided in the voltage and frequency profile range respectively, of each chip or user-defined profile configuration. The chip voltage, and chip frequency, of each selected profile configuration, is dynamically adjusted to determine tuned parameters (a target chip voltage, and target chip frequency) needed to provide the lowest ASIC chip power usage or consumption at the highest optimal hashrate for managing operational costs, chip temperature, and garnering higher profits when mining digital currency. Determining the most efficient target chip voltage for a given chip frequency range is important because chip voltage corresponds to the power consumed by ASIC chips 66, 68, 70, and 72. As the power usage or consumption of ASIC chips decreases, so does the cost of electricity, and the heat generated by ASIC chips 66, 68, 70 and 72. The maximum chip voltage determined during the core initiation process, and defined in the voltage profile range of each chip profile configuration, is dynamically increased or decreased, a preset voltage value, to find the target chip voltage that is needed for overcome chip instability to effectively manage power usage of ASIC chips. In finding the target chip voltage, the maximum chip voltage is decreased, a voltage value as predefined in each profile configuration, until instability of each ASIC chip 66, 68, 70, 72 is determined within a given chip frequency profile range. In one example, the voltage value may include a range of 0.01 volts to 1 volts. Chip instability is found when the performance of one or more ASIC chips 66, 68, 70, 72 falls below a threshold hashrate, or alternatively, when communication with the ASIC chips is lost. Users can set a threshold hashrate value as either a percentage of an ideal hashrate, or as a fixed hashrate value. Users may select a threshold hashrate from a drop down menu (not shown), or manually enter a threshold hashrate value in a designated entry box. A threshold hashrate value may comprise, for example, 85%, 90%, or 95% of the ASIC chips ideal hashrate. If the ideal hashrate of the ASCI chip includes 100 hashes per second, and a threshold hashrate is set at 90%, the threshold hashrate is 90 hashes per second. When the hashrate of one or more ASIC chips 66, 68, 70, 72 falls below the threshold hashrate of 90 hashes per second, the auto-tuning process stops decreasing the maximum chip voltage to provide the lowest chip voltage for a given frequency range. In some circumstances, the lowest chip voltage may include a value that is lower than the minimum chip voltage provided in the voltage profile range of the selected chip profile configuration. In such cases, the auto-tuning process can ignore the minimum voltage limit of the voltage profile by enabling the feature at 233 in FIG. 5. This feature is enabled when chip instability is found at a chip voltage that is lower than the minimum chip voltage provided in the voltage profile range associated with the selected chip profile configuration. In disabling the minimum voltage limit, the lowest chip voltage may include a value that is less than the minimum chip voltage provided in each voltage profile range associated with each chip profile configuration. It is noted that in a shared voltage supply configuration, a decrease in maximum chip voltage results in a decrease in maximum chip voltage for all ASIC chips 66, 68, 70, 72 at the same time, and an increase in chip voltage results in an increase of chip voltage for all ASIC chips at the same time. In a non-shared voltage supply system, decreasing the maximum chip voltage results in a decrease in maximum chip voltage for individual ASIC chips 66, 68, 70, 72 separately, one at a time, where the maximum chip voltage is decreased, via a same or different voltage value for each ASIC chip, until instability of each ASIC chip is reached, and where the chip voltage is slightly increased to provide the same or different target chip voltage for each ASIC chip to provide greater chip stability. As such, cryptocurrency mining machines 16, 18, 20, nth operating in a non-shared voltage supply system may have a same or different target chip voltages applied to ASIC chips. In adjusting chip voltage of ASIC chips, the mother board 60 of each cryptocurrency mining machine electrically communicates with the power supply 61, and PIC 74, 76 to manage and control the power supply 61 in delivering the requisite, controlled chip voltage to the ASIC chips.

Once the lowest chip voltage has been found, auto-tuning begins the frequency tuning of the ASIC chips 66, 68, 70, and 72. The frequency tuning process finds the optimal target chip frequency that is needed for the ASIC chips to function at an ideal hashrate attributed to each ASIC chip to garner the most profits when mining digital currency. The ideal hashrate of each ASIC chip is generally based on a number of hashing cores. The term, "hashrate" is a measuring unit of the total computational processing power used to mine and process transactions on a proof-of-work block chain (i.e. the processing power of a bitcoin network). Basically how many times an ASIC chip calculates the output of a hash function, or the speed at which a cryptocurrency mining machine solves a difficult mathematical puzzle. The hashrate is a measure of how many times the network attempts to complete the difficult mathematical puzzle every second to earn rewards in coins which can be exchanged for real money. Each ASIC chip 66, 68, 70, 72 includes a number of hashing cores that include block chain algorithms, such as SHA-266 algorithms for mining bitcoins, or ethash algorithms for mining Ethereum coins. Each hashing core performs one calculation for each clock tick of an ASIC chip clock speed. As such, the ideal hashrate of each ASIC chip 66, 68, 70, 72 is based on the known number of hashing cores. In one example, a cryptocurrency mining machine 16, 18, 20, nth has 672 hashing cores on each ASIC chip 66, 68, 70, and 72. If a chip frequency includes 660 MHz, then a single ASIC chip running at 660 MHz is processing 336,000 calculations per second. (672 hashing cores multiplied by 660 MHz). If a hash board 62 includes 48 ASIC chips for example, it would provide an ideal hashrate of 16.1 TH/s (336,000 calculations per second for each ASIC chip multiplied by 48 ASIC chips=16,126,000 calculations per second). A total of 3 hash boards would yield roughly a total ideal hashrate of 48 TH/s. It is noted that cryptocurrency mining machine 16, 18, 20, nth may have any number of hash cores for mining different types of digital currency.

The dynamic tuning firmware 100 includes instructions and/or computer code to perform a metric data collection and analysis process 121 for collecting performance metric data. Electrical communication between electronic components is initiated to collect, monitor, process, manage, analyze, and store performance metric data or information used for auto-tuning ASIC chips 66, 68, 70 and 72. The performance metric data or information may include, but is not limited to, power usage, hashrate, chip temperature, chip voltage, chip frequency, profit, internal temperature of housing 56, environmental temperature, changes in profit variables, humidity, rotational speed of fans 68, 70, measurement data associated with PWM signals, and the operational status of I/O interface 58, power supply 61, mother board 60, hash boards 62, 64, sensors 82, 84, 86, 88, 90, 92, and communication network 22. Performance metric data can be measured in real-time using electronic measuring circuitry or devices, or alternatively calculated in accordance with mathematical equations or algorithms. Metric analysis may be initiated every x seconds, minutes, or hours, like every 30 seconds, 2 minutes, or 1 hour, or at a certain time of day like at 3 p.m. every day, or when a change in value associated with a condition parameter is detected, such as a change in chip temperature, or profit. Performance metric data or information is stored in metric data management files, indexes, in one or more look-up tables, or via, other data management configurations that are stored on each associated cryptocurrency mining machine, on database 24, on server 26, on computing devices 12, 14, and/or on an external memory device, or any combination thereof. During auto-tuning, performance metric data including for example, hash rate/calculations a second, is collected to determine chip hashrate, chip temperature, and power usage. Auto-tuning dynamically adjusts the chip frequency of each ASIC chip, as provided in the frequency profile range associated with each profile configuration, until a target chip frequency is found to provide the hashrate that is closest to the ideal hashrate, or at or above a hashrate threshold, of each ASIC chip. It is appreciated that optionally, once the target chip frequency is determined, the lowest chip voltage determined during core initialization is subsequently increased slightly to provide greater chip stability. During auto-tuning chip frequency, the mother board 60, of each cryptocurrency mining machine, communicates with PIC 74, 76 of each hash board 62, 64 to manage and control frequency regulator/generator circuitry provided in each cryptocurrency mining machine to manage controlled generation and deliver of chip frequency.

In some circumstances, auto-tuning may have difficulty determining the target chip voltage, and target chip frequency needed to effectively tune each ASIC chip for some reason or another. For example, every ASIC chip is unique in terms of quality and manufacturing because the quality of silicon materials used to fabricate the chips is not 100% uniform. As a result, some ASIC chips 66, 68, 70, 72 may have certain manufacturing defects, retain chip instability, or continuously perform poorly when mining digital currency. In such circumstances, it may be advantageous to limit the amount of times that auto-tuning attempts to correct the performance of poorly performing ASIC chips, and concentrate on managing the ASIC chips that are functioning properly. As such, each chip profile configuration, and user-defined profile configuration, includes, inter alia, a tuning cycle that represents an x number of times auto-tuning is applied to ASIC chip 66, 68, 70, 72 in an effort to find an efficient target chip voltage, and optimal target chip frequency. As provided in a given example at 410 in FIG. 8, a representative example of a tuning cycle of 15 signifies that auto-tuning will be performed on poorly performing ASIC chips a total number of 15 times in an effort to find target chip voltages, and target chip frequencies that are needed for improving the power usage and hashrate of the poorly performing ASIC chips 66, 68, 70, and 72. When all ASIC chips are found to perform within an acceptable power usage and threshold hashrate levels, or when the preset auto-tuning tuning cycle has been reached, auto-tuning terminates the process of auto-tuning, until reinitiated as a result of changes in performance metric data and/or condition parameters including chip temperature, or profit.

Once auto-tuning determines the tuned parameters (i.e. the target chip voltage, and target chip frequency) needed for ASIC chips to operate at the lowest power to overcome instability, and at the most efficient hashrate close to the ideal hashrate, each cryptocurrency mining machine 16, 18, 20, nth is rebooted to apply the tuned parameters to the ASIC chips 66, 68, 70, 72 via, electrical communication of the mother board 60, power supply 61, and PIC 74 and 76. If after rebooting, the applied target chip voltage, and target chip frequency does not improve the performance of ASIC chip 66, 68, 70, 72, auto-switch selectively switches to another chip profile configuration and adjusts the chip voltage, and chip frequency provided in the voltage and frequency profile range of the selected chip profile configuration, to determine new tuned parameters that improve the performance of poorly operating ASIC chip 66, 68, 70, and 72. Each cryptocurrency mining machine 16, 18, 20, nth is subsequently rebooted again to apply the newly determined tuned parameters in an effort to improve the performance of the poorly operating ASIC chips 66, 68, 70 and 72. When the auto-switch mode is enabled, auto-switch selectively switches between chip profile configurations where the auto-tuning process dynamically adjusts the chip voltages and chip frequencies provided in voltage and frequency profile ranges associated with the selected chip profile configuration, to determine the requisite target chip voltage, and target chip frequency needed to effectively manage chip temperature, and/or garner higher profits. A restart mode is provided to automatically reboot the cryptocurrency mining machines 16, 18, 20, nth, and reinitialize auto-tuning when ASIC chips perform poorly such as, when the temperature of the ASIC chips, or hash boards 62, 64 falls outside acceptable temperature ranges, or when hashrate values fall below a predefined percentage of the ideal threshold hashrate. In one example, users can preconfigure a time that the mining machines will be rebooted. As provided at 239, in FIG. 5, the preconfigured cryptocurrency mining machines will be rebooted every 6 hours. In one embodiment, as shown at 240 in FIG. 5, users can also limit the number of times the cryptocurrency mining machines are rebooted by forcing the cryptocurrency mining machines into a sleep mode, Once the tuned parameters are determined to effectively manage power usage, chip temperature, and/or the highest profits, the tuned parameters are learned via, machine learning module/models/algorithm module, and stored in a tuned chip parameter data index, file, or table stored on each cryptocurrency mining machine 16, 18, 20, nth, computing device 14, 16, and/or database 24. When auto-tuning is subsequently re-initiated based on changes in condition parameters such as temperature or profit, each of the tuned chip parameters are retrieved, and dynamically adjusted to determine new target chip voltages, and new target chip frequencies. Dynamically adjusting previously tuned chip parameters not only saves time, effort, and energy, but increases time spent mining digital currency thus increasing profit.

Machine learning module/models/algorithms may be implemented to automatically configure chip profile configurations including voltage and frequency profile ranges, apply chip profile configurations, adjust chip voltages and chip frequencies of selected chip profile configurations, configure chip profile configurations based on previously tuned chip parameters, categorize previously or newly tuned chip parameters, and/or determine target chip voltages, and target chip frequencies that provide efficient power usage and optimal hashrate values, respectively, for effectively managing the performance of ASIC chip 66, 68, 70, and 72 based on temperature or profits. The machine learning module/models/algorithms 38, 130 may be provided on each computing device 12, 14, or on each cryptocurrency mining machine 16, 18, 20, nth via, dynamic tuning firmware 138. For example, each cryptocurrency mining machine can send a request to computing devices 12, 14 to receive update information, training date, machine learning models, or other machine learning data or information, via communication network 22. Update information may include updated versions of machine learning models/algorithms, new machine learning algorithms, updated weighted values, training data, operational parameters, and/or structure of the machine learning models. The machine learning module/models/algorithms may include unsupervised machine learning, or supervised machine learning such as regression analysis to predict output values or classifications from input values. Machine learning may employ identifying weighing values, model settings, learning algorithms, and/or training data to generate outputs bases on inputs. Training data may be established by testing, accessor error, re-adjusting underlying parameters, and include, but not limited to, voltage and frequency profile ranges, tuning cycles, increment and decrement voltage or frequency values, chip profile configurations, power usage or consumption, hashrate values, profit variables, temperatures or temperature ranges including chip temperatures, hash board temperatures, environment temperature, power usage algorithms, profit algorithms, performance metric information or data, historical use data, measured or calculated tuned parameters, manufacturing specifications of ASIC chips, historical target chip voltages, and frequencies, chip instability values, supply voltage values, data tables, data indexes, profits, or other input data. Training data can be used for training any number of machine learning models. Various machine learning techniques including different algorithms, or training methods can be used to build any number of machine learning models that work in unison with the dynamic tuning firmware to control and manage the operation and performance of cryptocurrency mining machines 16, 18, 20, nth, via, ASIC chips 66, 68, 70 and 72.

Optimizing performance of ASIC chips 66, 68, 70, 72, to promote efficient operation of cryptocurrency mining machines 16, 18, 20, nth, is based on various condition parameters including temperature, and more particularly, temperature of ASIC chips, and/or hash boards. Temperature significantly impacts the performance of ASIC chips and/or hash boards, and if not properly managed, can cause damage, compromise the operation of cryptocurrency mining machines, and diminish mining profits. Managing chip and hash board temperature is governed by the temperature control management process 118 of the dynamic tuning firmware 100. Temperature control management process 118 includes instructions, and/or computer code that when initiated, control and manage electric communication between the mother board 60, temperature sensors 78, 80, 82, 84, on-chip temperature sensors 86, 88, 90, 92, and fan control module 67, to continuously monitor the temperature of ASIC chips 66, 68, 70, 72, and/or hash boards 62, 64 while mining digital currency. Power consumed by ASIC chips generally correlates to chip temperature, and as the power usage increases, so does the temperature of ASCI chips. Thus, one method of controlling chip temperature is to manage the power consumed by the ASIC chips, and/or hash board boards. As illustrated in FIG. 5, the dynamic tuning firmware 100 allows users to preset, target chip temperature ranges in advance. Guidance to proper operating temperature ranges may be provided in manufacturing product specifications when presetting temperature ranges. Safe operating temperature ranges for ASIC chips and/or PCB boards are provided in advance by users via, a target chip temperature 214, a maximum chip temperature 216, and a minimum chip temperature 218. In one given example, there is provided a target chip temperature of 70 degrees, a maximum chip temperature of 85 degrees, and a minimum chip temperature of 60 degrees. It is appreciated that the mining profile configuration screen 202 may provide designated entry boxes for entering hash board temperature ranges as well to manage the temperature of hash boards 62, 64 within prescribed temperature ranges. When measuring temperature of ASIC chip 66, 68, 70, 72, and/or hash boards 62, 64, the on-chip temperature sensors 86, 88, 90, 92, and hash board temperature sensors 78, 80, respectively, generate and transmit electrical signals associated with measured temperatures to the mother board 60 via, PIC 74, 76 provided on each PCB hash board 62, 64. Each mother board 60 of each mining machine processes the received electrical signals and communicates with the fan control module 67, and sensors 94, 96 to control fans 68, 70 to cool ASIC chips 66, 68, 70, 72, hash boards 62, 64, or other electronic components provided in each cryptocurrency mining machine 16, 18, 20, and nth.

Additional temperature sensors may be employed to measure other condition parameters of interest. For example, a temperature sensor 82 may be employed to measure the internal temperature of each cryptocurrency mining machine 16, 18, 20, nth, and temperature sensor 84 may be used to measure the environmental temperature in which cryptocurrency mining machines operate. Temperature sensors 82, 84 are electrically coupled to mother board 60 which communicates with fan control module 67 to manage the operation of fans 68, 70 based on temperatures associated with the internal region of housing 56, or of the environment in which the cryptocurrency mining machines operate.

Temperature of the ASIC chip and/or PCB hash boards is effectively managed by a variety of cooling methods preconfigured by users. One method includes a fan only cooling method where the fans 68, 70 are operated at a preset speed to cool the ASIC chip 66, 68, 70, 72, and/or hash boards 62, 64 regardless of the temperature of ASIC chips, and/or hash boards. As illustrated at 229 in FIG. 5, users can manually preset a percentage of PWM signal used for operating fans 68, and 70. The PWM signal measurement and control functionality 122 of the dynamic tuning firmware 100, includes the necessary instructions and/or computer code to communicate with mother board 60 to electrically instruct fan control module 67 to deliver a controlled PWM signal to fans 68, 70 for controlling the speed of fans 68, and 70. For example, as shown at 229, with a PWM preset value of 100%, mother board 60 instructs the fan control module 67 to deliver a PWM signal to fans 68, 70 to operate the fans at full speed regardless of the temperature of ASIC chips, and/or hash board. Although the PWM operator 229 depicts application of a percentage of PWM, it is appreciated that operator 229 may depict a percentage of RPM or an RPM value. Using only the fans 68, 70 to cool ASIC chips and/or the hash boards is less effective, more challenging, and daunting where environmental temperatures are considered high or vary greatly.

Another method for cooling ASIC chips 66, 68, 70, 72, and/or hash boards 62, 64 includes an auto-switch only cooling method where fans 68, 70 are disabled, and the auto-switch mode is enabled for auto-tuning to selectively switch between chip profile configurations for dynamically adjusting chip voltages and chip frequencies provided in voltage and frequency profile ranges associated with selected chip profile configurations, to find a target voltage that produces lower power usage to help reduce heat. Since target chip voltage correlates to power usage, the higher the target chip voltage the higher the power usage, and the more heat generated, where the lower the target chip voltage the lower the power usage and the lower the heat generated by the ASIC chips. When the auto-switch mode is enabled, and the measured temperature of the ASIC chips 66, 68, 70, 72, and/or hash boards 62, 64, fall outside acceptable temperature ranges, auto-switch selectively switches between chip profile configurations and auto-tuning dynamically adjusts the chip voltage, and chip frequency of voltage and frequency profile ranges associated with the selected chip profile configuration, to find a target chip voltage that produces lower power usage at a given frequency range. In managing chip temperature for example, if during metric analysis it is determined that a measured chip temperature, of one or more ASIC chips 66, 68, 70, 72 exceeds an upper chip temperature value, provided at downscale if chip temp value higher 216 as shown in FIG. 5, or if the measured chip temperature falls below a lower chip temperature value, provided in upscale if chip temp value lower 218, auto-switch selectively switches from one chip profile configuration to another chip profile configuration, and auto-tuning dynamically adjusts the chip voltage, and frequency provided in the voltage and frequency profile range associated with the selected chip profile configuration to find a target chip voltage that provides a lower power usage at a given target chip frequency to help reduce heat, while managing the performance of ASIC chip 66, 68, 70, and 72. The auto-switch only cooling method is repeated an x number of times to find a power usage value that maintains the temperature of ASIC chips within a safe, operating temperature range. In one embodiment, when switching between chip profile configurations, auto-switch changes from a chip profile configuration having a higher maximum chip voltage, and higher maximum chip frequency, to a chip profile configuration having a lower maximum chip voltage, and lower maximum chip frequency. On the other hand, if the ASIC chip temperature falls below a lower chip temperature value, provided in upscale if chip temp value lower 218, auto-switch switches from a chip profile configuration having a lower maximum chip voltage, and lower maximum chip frequency, to a chip profile configuration having a higher maximum chip voltage, and higher maximum chip frequency where auto-tuning finds a target chip voltage, and target chip frequency that produces a higher hashrate. It is appreciated that when the cryptocurrency mining machines 16, 18, 20, nth operate in cooler environments, the lower temperatures allow users to increase target chip frequency, or overclock the ASIC chips, to achieve a higher hashrate for increasing profits while managing less heat.

In certain circumstances, either the fans 68, 70, or auto-switch mode alone, is not enough to properly manage the temperature of ASIC chips 66, 68, 70, 72, and/or hash boards 62, and 64. A more effective measure employs use of both the fans 68, 70, and the auto-switch mode to more aggressively control temperature and cool the ASIC chips. In reference to controlling chip temperature for example, if during metric analysis the measured temperature of one or more ASIC chips 66, 68, 70, 72 exceeds an upper chip temperature value as provided at downscale if chip temp value higher 216 in FIG. 5, auto-switch selectively switches from a chip profile configuration including a voltage and frequency profile range having a higher maximum chip voltage, and higher maximum chip frequency, to a chip profile configuration including a voltage and frequency profile range having a lower maximum chip voltage, and lower maximum chip frequency where auto-tuning dynamically adjusts the lower maximum chip voltage and lower maximum chip frequency, to find a target chip voltage that provides lower power usage to help reduce heat. Upon switching between chip profile configurations, the mother board 60, electrically communicates with fan control module 67 to gradually increase the PWM signal delivered to fans 68, 70 to increase the rotational speed of fans 68, 70, and forcibly draw heat away from the ASIC chip 66, 68, 70, and 72. In one example, auto-switch selectively switches to another preset chip profile configuration when the speed of the fans 68, 70 are operating above a predetermined PWM percentage threshold, and are unable, alone, to effectively reduce the temperature of ASIC chip 66, 68, 70, and 72. A predetermined percentage threshold is provided by users at 222 in FIG. 5 which corresponds to downscale profile if PWM is higher (switch to a chip profile configuration to provide a lower target chip voltage if PWM signal is too high). For example, with a predetermined PWM percentage threshold set at 90%, when the speed of fans 68, 70 exceeds the 90% PWM threshold, auto-switch selectively switches to a chip profile configuration having lower chip voltages for auto-tuning to find a target chip voltage that provides lower power usage to help reduce heat. With this approach, deference is given to the fans 68, 70 for cooling the temperature of ASIC chip, and auto-switch is employed when fans 68, 70 are operating above a predetermined PWM threshold, and are unable alone, to reduce the temperature of ASIC chip 66, 68, 70 and 72. When switching to a lower chip profile configuration, mother board 60 electrically communicates with the fan control module 67 to retain the speed of fans 68, 70 or to gradually decrease the PWM signal delivered to fans 68, 70 which decreases the rotational speed of the fans 68, 70 as a result of the lower power usage producing less heat.

However, if during metric analysis on-chip sensors 86, 88, 90, 92 measure the temperature of one or more ASIC chips 66, 68, 70, 72, and the measured chip temperature falls below a preset chip temperature value provided in upscale if chip temp value lower 218, auto-switch selectively switches from a chip profile configuration including a voltage and frequency profile range having a lower maximum chip voltage, and lower maximum chip frequency, to a chip profile configuration including a voltage and frequency profile range having a higher maximum chip voltage, and higher maximum chip frequency where newly determined target chip voltage, and target chip frequency associated with the selected chip profile configuration, is applied to ASIC chip 66, 68, 70, 72 to optimize the performance of the ASIC chip by increasing the hashrate while managing power usage and chip temperature. It is appreciated that efforts to cool ASIC chips, and/or hash boards are less imperative when cryptocurrency mining machines operate in cooler environmental temperatures. Upon switching between chip profile configurations, the mother board 60, communicates with fan control module 67 to decrease, maintain and/or gradually increase the PWM signal delivered to fans 68, 70 to increase the rotational speed of fans 68, 70 to forcibly draw heat away from the ASIC chip 66, 68, 70, 72 as the increased hashrate and power usage produces and increase in chip temperature over time. In one example, auto-switch selectively switches to another preset chip profile configuration when the speed of fans 68, 70 operates below a PWM percentage threshold as provided by users at 224 in FIG. 5 which corresponds to upscale profile if PWM is lower. For example, with a predetermined PWM percentage threshold set at 50%, when the speed of the fans 68, 70 goes lower than the preset 50% PWM threshold, auto-switch selectively switches to a higher chip profile configuration (upscale profile) where auto-tuning finds a target chip voltage and frequency that provides higher power usage to accommodate a higher hashrate. In this approach, when switching to a higher chip profile configuration, mother board 60 electrically communicates with the fan control module 67 to gradually increase the PWM signal overtime, to increase the rotational speed of the fans 68, 70 as a result of the higher power producing more heat over time. Enabling both operation of auto-switch and fans 68, 70 provides greater cooling of ASIC chips 66, 68, 70, 72, and/or hash boards 62, and 64. It is appreciated that the methods described herein for cooling ASIC chips, is also applicable to managing the temperature of has boards 62, 64, via sensors 78, 80, and fans 68 and 70.

As illustrated in FIG. 5, the dynamic tuning firmware 100 also provides a chain disable temp feature 225 where the cryptocurrency mining machine 16, 18, 20, nth will automatically turn off when the temperature of the ASIC chips, and/or hash boards exceeds a preset temperature value. The cryptocurrency mining machine may be manually rebooted, or automatically rebooted after a predefined period of time. It is appreciated that an additional disable temp feature can be provided for the cryptocurrency mining machines to automatically turn off when the internal and/or environmental temperature exceeds a preset temperature value.

Cryptocurrency miners 16, 18, 20, nth, and more specifically, ASIC chips 66, 68, 70, 72, require large amounts of processing power to solve inherently difficult algorithms when mining digital currency. Larger power demands result in higher operating costs, so mining digital currency, such as bitcoins, can be an expensive endeavor. To attain profitable margins while overcoming operating costs, cryptocurrency mining machines 16, 18, 20, nth must operate effectively and efficiently when mining digital currency. As such, optimizing the performance of ASIC chips 66, 68, 70, 72, to promote efficient operation of cryptocurrency mining machines 16, 18, 20, nth, is also based on a condition parameter including profit. A profit analysis process 124 of the dynamic tuning firmware 100 provides a profit analysis phase in which a profit algorithm is applied to tuned chip parameters to determine what tuned chip parameters provide the highest profits when applied to ASIC chips for mining a particular type of digital currency. In practice, auto-tuning dynamically adjusts the chip voltage and chip frequency, of voltage and frequency profile ranges associated with each chip profile configuration, to provide tuned chip parameters that include a target chip voltage and target chip frequency which provide the lowest power usage at the highest hashrate. The tuned chip parameters includes actual tuned chip parameters that are determined from selected chip profile configurations in real-time. However, in one alternative embodiment, the tuned chip parameters may include estimated tuned chip parameters that includes target chip voltages and target chip frequencies that are determined from the average or mean values of historical target chip voltages, and chip frequencies used in previous mining operations, or calculated target chip voltages, and target chip frequencies based on power usage, and hashrate values. Tuned chip parameters are stored in tuned data management files, data indexes, or in look-up tables stored on each control unit 14, 16, in memory of mother board 60, in database 24, and/or on server 26. When mining a particular digital currency such as bitcoin, the profit analysis phase applies a profit algorithm to the tuned parameters to determine what tuned parameters provide the lowest power and highest hashrate to garner the highest profit when mining bitcoin.

Figure 9:
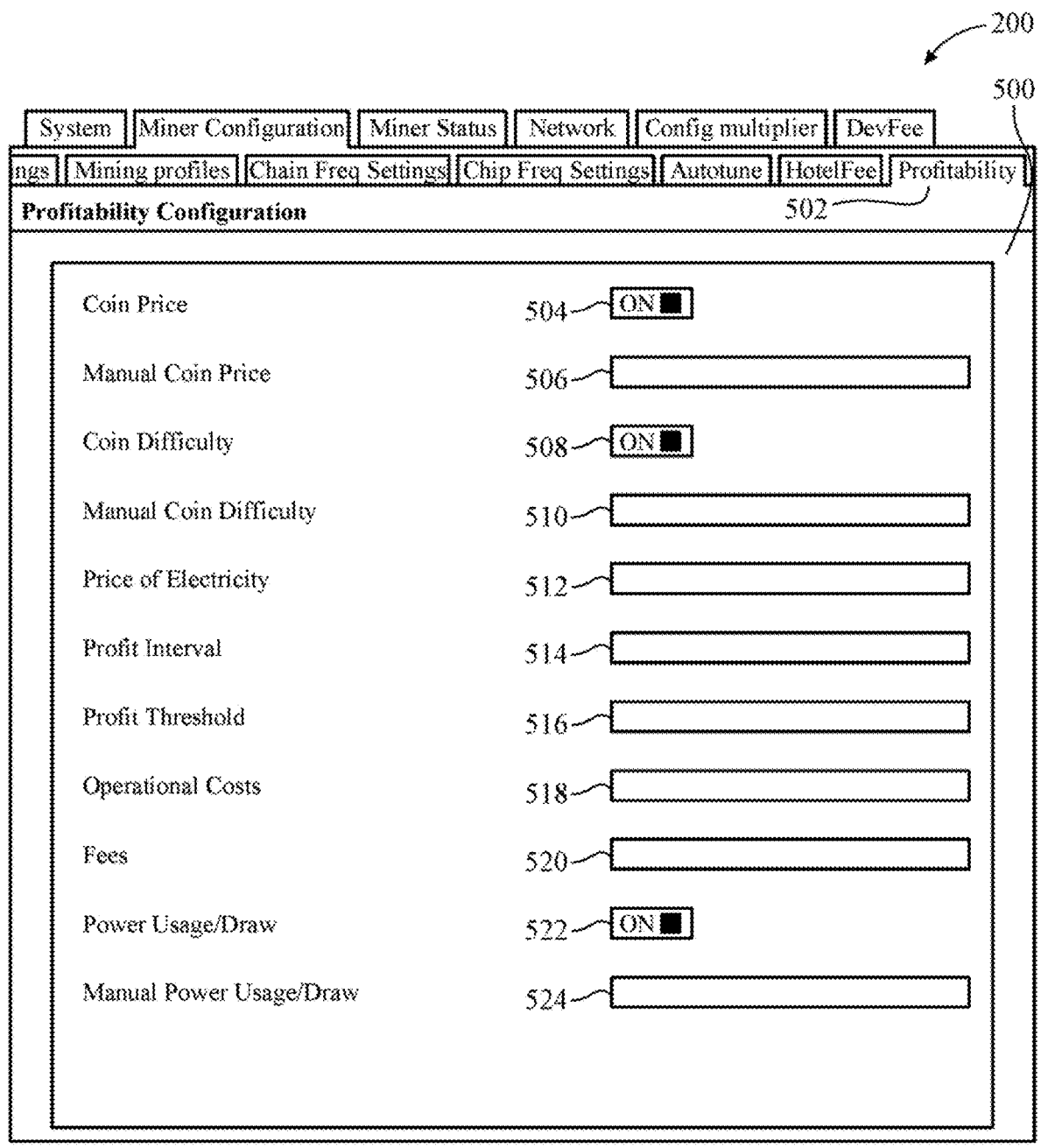
FIG. 9 illustrates a profitability configuration screen for preconfiguring profit variables for calculating profit for auto-tuning cryptocurrency mining machines based on the calculated profit when mining a specific, type of digital currency.

The profit analysis phase begins by pre-configuring profit variables used in the profit algorithm process. The tuning preset configuration block 102 of the dynamic tuning firmware 100 provides a profitability configuration interface 110 which generates a profitability configuration screen 500, as shown in FIG. 9. A profitability sub-function tab 502, associated with the miner configuration tab 204, is activated to access the profitability configuration screen 500 to pre-configure profit variables used during the profit analysis phase for determining profits. Two such profit variables include current price of digital currency mined (coin price), and difficulty (D). Both current coin price, and difficulty are generally managed by a third party, via, a digital mining currency exchange network 28, shown in FIG. 1. The coin price may be established in two different ways. For example, enabling a coin price operator 504 allows each cryptocurrency mining machine 16, 18, 20, nth via, the dynamic tuning firmware, to automatically retrieve the current coin price from the digital currency exchange network, via server 26 over communication network 22. It is noted that current coin prices can be retrieved automatically every x seconds, minutes, hours, or days, or an X number of times, or on a particular day and time. Alternatively, users can manually enter the coin price in a designated entry box 506, if known by users in advance. Profit variable difficulty (D) is a measure of how difficult it is to find a correct hash (solve a complex cryptocurrency mathematical puzzle) when mining digital currency. For example, a bitcoin block is added to a block chain every 10 minutes, and difficulty is adjusted periodically over time, (i.e. is increased or decreased) to manage the time in which the bitcoin block is added to the block chain depending on various factors including for example, the number of miners on the network, and the combined hash power used. The digital mining network protocol automatically adjusts difficulty after 2016 blocks have been mined in the network. Difficulty is based on the ease at which bitcoins are mined. For example, when it is easy to mine bitcoins, difficulty is increased, and when it is harder to mine bitcoins difficulty is decreased. As such, difficulty must be taken into consideration when ascertaining profits. As shown in FIG. 9, there is provided a coin difficulty operator 508 for automatically retrieving difficulty from the digital currency network exchange 28. Alternatively, the coin difficulty operator 508 may be disabled, and difficulty can be manually entered via, designated entry box 510, if known by users.

Additional profit variables used in the profit analysis phase, includes the price of electricity 512, a profit interval 514, and a profit threshold 516. The profit interval 514 may include an x number of times, or a specific time that the profit phase is initiated to determine which tuned parameters provide the highest profits. For example, a profit interval of 12 hrs, or a profit interval set at 9 a.m. means the profit algorithm phase occurs every 12 hrs. or at 9 a.m. every day. As illustrated in FIG. 9, users can manually enter a profit threshold in a designated query box 516. The profit threshold 516 may include a percentage of calculated profits, or alternatively, a fixed numerical value, or any combination thereof. For example, if calculated profit falls below a chip profit threshold, auto-switch selectively switches between tuned chip parameters to find tuned chip parameters (i.e. a target chip voltage and target chip frequency) that provides the lowest power usage, and the highest hashrate to garner a profit that is equal to, or greater than, the chip profit threshold value, and applies selected tuned parameters to the ASIC chips to mine digital currency. In one embodiment, the profitability configuration screen 500 may provide a drop down menu (not shown) that provides a plurality of selectable predetermined profit threshold values. The profit analysis may also take into account the amount of change in the profit or the amount of departure from the profit threshold. For example, if the profit change is minimal, it may not be economically advantageous to switch parameters based on chip down time while the parameters are being switched. In other words, there may be a predetermined profitability change threshold that must be exceed before it becomes economically advantageous to change the parameters.

Certain costs and fees associated with mining digital currency are included as profit variables when determining net profit. The price of electricity for operating cryptocurrency mining machines 16, 18, 20, and nth impacts profit margin. As shown in FIG. 9, the price of electricity is manually entered by users at 512, or alternatively, each cryptocurrency mining machine 16, 18, 20, nth can include circuitry to automatically retrieve the price of electricity from an electrical power grid via, communication network 22. Thus, in an exemplary embodiment, calculating the estimated profitability of a mining chip may include calculating an estimated power consumption of the mining chip (based on voltage and frequency in one embodiment), and using this estimated power consumption along with the electricity price to further calculate the estimated profitability. Cost may also include operational costs attributed to maintenance, repairs, parts, labor, transport, network services, storage, lighting, cooling, shelter, and loss profits. The accumulated value of operational costs is entered by users at 518. Fees associated with operating cryptocurrency mining machines 16, 18, 20, nth, may include fees for miner pools, network services, rental, storage, or transport, firmware, exchanging or selling digital currency, license, contract, lease, or royalty. The accumulated value of fees is entered by users at 520. Costs and fees associated in operating each cryptocurrency mining machine 16, 18, 20, nth may be itemized, categorized, or classified in cost and fee data management files, indexes, tables, that are stored in memory on mother board 60, in database 24, on server 26, and/or on computing device 12, 14, or any combination thereof.

Another profit variable considered includes power consumption. As the standard of difficulty D, and/or hashrate increases, so does the power consumed by the ASIC chip 66, 68, 70, 72 to continuously process mining algorithms. As shown in FIG. 9, a power usage operator 522 is selectively enabled by users for each cryptocurrency mining machine to retrieve the power usage value of each machine for use as a profit variable in the profit algorithm. Power usage of each individual cryptocurrency mining machine is defined as power consumed by all electronic components including I/O interface network 36, control board 60, fans 68, 70, power supply 66, sensors 78, 80, 82, 84, 86, 88, 90, 92, and ASIC chip 66, 68, 70, 72, or alternatively, as power consumed only by the ASIC chips 66, 68, 70, and 72. Power usage is either calculated by considering the target chip voltage, and target chip frequency of each chip profile configuration, or alternatively, power usage is actually measured in real-time via, electrical power measuring circuitry or modules provided in each cryptocurrency mining machine 16, 18, 20, and nth, or by a power grid. Either the calculated, or measured power usage is employed to compute profits when mining digital currency. In one alternative embodiment, power usage is manually entered by users if known, via, a designated entry box 524. In another embodiment, upon enabling the power usage operator 522, each cryptocurrency mining machine 16, 18, 20, nth electrically communicates with an electrical power grid via, communication network 22, to automatically retrieve the power usage value from the electrical power grid which is automatically stored on the mother board 60 for use in the profit algorithm.

Still another profit variable used in determining profits includes the hashrate (H) of ASIC chip 66, 68, 70, and 72. Typically, as hashrate increases, so does profit because ASIC chips are solving complex mathematical equations at greater speeds which is why it is important to find the target chip frequency that provides for the highest hashrate. The hashrate of each ASIC chip can be determined in real-time, or calculated based on the number of hash cores. Other profit variables to consider include number of days N spent mining for digital currency, and a reward per block chain B provided by the digital currency network exchange 28 protocols.

During a profit analysis phase, a profit algorithm is applied to each of the tuned chip parameters (i.e. the target chip voltages, and target chip frequencies associated with each chip profile configurations). The profit algorithm calculates profit based on power usage associated with each target chip voltage, and hashrate associated with target chip frequency. The profit algorithm is formulated to determine gross, or net profits. In one example there is provided a net profit algorithm defined as: $(((N \times B \times H \times S/D \times 2^{32}) \times coin\ price) - (power\ usage \times price\ of\ electricity) - costs - fees)$, where N is the number of mining days; B is the reward per block, H is the hashrate (hashes per second) as determined by the target chip frequency; S is the number of seconds per day; D is difficulty, coin price is current price of digital currency or coin being mined, power usage is the retrieved, measured, or calculated power usage associated with the target chip voltage, price of electricity is established by the third-party electrical company, and costs and fees are associated with operating cryptocurrency mining machines.

A few representative examples are provided to explain applicability of the profit algorithm to tuned chip parameters associated with selected chip profile configurations. It is noted that for exemplary purposes only, the cost of electricity, power usage, and mining pool fee are the only costs, and fees considered in the examples. Additional operations costs, and fees are generally applied when determining net profits. Each example is directed to a single cryptocurrency mining machine 16 that is mining digital currency including bitcoin. It is understood that the example may be directed to mining other types of digital currency.

First Example

Exemplary Profit Variables
  Coin Price Enabled—ON ($59,000.00, automatically retrieved from digital exchange)
  Manual Coin Price—N/A
  Difficulty Enabled—ON (D=23,137,439,666,472)
  Manual Coin Difficulty—N/A
  Price of Electricity—$0.10 kWh
  Profit interval—12 hours
  Profit Threshold—5%
  Operational costs—$0
  Fees—4%
  Power Usage—ON
  Manual Power Usage—N/A
  H=25 TH/s (hashrate of ASIC chips at one chip profile configuration)
  N=1 day (default to 30 days of mining)
  B=6.25
  S=86620 (number of seconds per day)

In a first example, tuned chip parameters associated with a selected chip profile configuration include a target chip voltage of 17 volts, and a target chip frequency of 660 MHz, which yields a chip hashrate of 25 TH/s based on the target chip frequency of 660 MHz, and a calculated power usage of 1000 watts (1 kw) based on a target chip voltage of 17 volts. It is noted that the hashrate, and power usage includes an average or mean value of all ASIC chips 66, 68, 70, 72 provided in a designated cryptocurrency mining machine 16.

In contemplating profit variables set at: N=1 day, B=6.25, H=25 th/s; S=86620, and D=23,137,439,666,472.00, the cryptocurrency mining machine 16 mines 0.000135 bitcoins a day (1×6.25×25×86620)/23,137,439,666,472×$2^{32}$). The gross profit for mining 0.000135 bitcoins in one day is $7.965 per day (i.e. bitcoin price $59,000.00×0.000135). A power usage of 24 kWh (1 kWh×24 hrs. of mining) at a rate of 10 cents per kilowatt hr results in a cost of $2.42 a day. Fees such as mining pool fees of 4% yields $0.097 a day. As such, in accordance with tuned chip parameters having a target chip voltage of 17 volts, and target chip frequency of 660 MHz, the cryptocurrency mining machine 16 has made a net profit of $5.448 per day. ($7.965−$2.42−$0.097). Given a hashrate of 25 TH/s at 1000 watts of power usage, the efficiency of the cryptocurrency mining machine 16 is 40 watts/th. Thus, cryptocurrency mining machine 16 consumes 62 watts of power for every 1 th/s of hashing power.

Attributing the first example to a preconfigured chip profile threshold, when the calculated net profit falls below the profit threshold provided by users at 516 in FIG. 9, the cryptocurrency mining machine 16 continues to selectively switch between different tuned chip parameters where the profit analysis phase applies the profit algorithm to each of the selected tuned parameters to determine which of the tuned parameters provide a net profit that is equal to, or higher than, the chip profit threshold value. Thus, given an exemplary profit threshold of 5%, if upon initiating the profit analysis phase it is determined that the net profits attributed to selected tuned parameters falls below $5.266 ($5.533−($5.533×0.05)), the cryptocurrency mining machine 16 will selectively switch between different tuned parameters until a calculated net profit of a selected tuned parameters reaches, or exceeds a profit of $5.266. Per the profit interval 414, the profit analysis phase applies the profit algorithm to each of the tuned parameters to determine net profit every 12 hours when mining for bitcoin.

There is provided a second example of calculating net profit for different tuned parameters associated with another selected chip profile configuration that provides higher hashrate, and power usage values.

Second Example

Exemplary Profit Variables
Coin Price Enabled—ON ($59,000.00, automatically retrieved from digital exchange)
Manual Coin Price—N/A
Difficulty Enabled—ON (D=$^2$3,137,439,666,472)
Manual Coin Difficulty—N/A
Price of Electricity—$0.10 kWh
Profit interval—12 hours
Profit Threshold—5%
Operational costs—$0
Fees—4%
Power Usage—ON
Manual Power Usage—N/A
H=66 TH/s (hashrate of ASIC chips at another chip profile configuration)
N=1 day (default to 30 days of mining)
B=6.25, S=86620

In this example, tuned chip parameters associated with another selected chip profile configuration includes a target chip voltage of 19 volts, and a target chip frequency of 700 MHz, yielding a hashrate at 66 TH/s, and a calculated power usage of 3000 watts (3 kW). In contemplating profit variables set at: N=1 day, B=6.25, H=66 TH/s; S=86620 sec, and D=23,137,439,666,472.00, the cryptocurrency mining machine 16 mines 0.00027 bitcoins a day (1×6.25×66×86620)/23,137,439,666,472×$2^{32}$). The gross profit for mining 0.00027 bitcoins in one day is $15.93 per day (i.e. bitcoin price $59,000.00×0.00027). Considering power usage of 72 kWh (3 kwh×24 hrs.) at a rate of 10 cents per kWh results in $7.20 a day, and fees associated with mining pool fees of 4% yields $0.288 As such, with a hashrate of 66 TH/s, cryptocurrency mining machine 16 has made a net profit of $8.442 per day ($15.93−$7.20−$0.288). Given a hashrate of 66 TH/s, and 3000 watts of power usage, the mining machine is operating at an efficiency of 45.45 watts/th. When cryptocurrency mining machine 16 utilizes the newly selected tuned parameters, the mining machine consumes 60 watts of power for every 1 th/s of hashing power. As shown, an increase in both hashrate, and power usage, pursuant to newly selected tuned chip parameters, has generated higher profits in one day when compared to the profit of the first tuned parameters in the first example.

A third example is provided to illustrate calculating net profit for differently selected tuned parameters which include a target chip voltage, and target chip frequency that provide for a higher power usage, and hashrate.

Third Example

Exemplary Profit Variables
Coin Price Enabled—ON ($59,000.00, automatically retrieved from digital exchange
Manual Coin Price—N/A
Difficulty Enabled—ON (D=23,137,439,666,472)
Manual Coin Difficulty—N/A
Price of Electricity—$0.10 kWh
Profit interval—12 hours
Profit Threshold—5%
Operational costs—$0
Fees—4%
Power Usage—ON
Manual Power Usage—N/A
H=60 TH/s (hashrate of ASIC chips at another chip profile configuration)
N=1 day (default to 30 days of mining)
B=6.25
S=86620 (number of seconds per day)

In the third example, tuned chip parameters associated with another selected chip profile configuration includes a target chip voltage of 18 volts, and a target chip frequency of 800 MHz, yielding a chip hashrate at 60 TH/s, and a calculated power usage of 8000 watts (8 kW). An increase in power usage, and hashrate correlates to an increase in both target chip voltage and target chip frequency determined from the selected chip profile configuration. With profit variables set at the following: N=1 day, B=6.25, H=60 TH/s; S=86620 sec, and D=23,137,439,666,472.00, the cryptocurrency mining machine 16 mines 0.000324 bitcoins a day (1×6.25×60×86620)/23,137,439,666,472×$2^{32}$). The gross profit for mining 0.000324 bitcoins in one day is $19.234 per day (i.e. bitcoin price $59,000.00×0.000324). Considering power usage of 192 kWh (8 kwh×24 hrs.) at a rate of 10 cents per kWh results in a cost of $19.20 a day, and fees such as mining pool fees of 4% yields $0.768. Given a hashrate of 60 TH/s, cryptocurrency mining machine 16 has made a net profit of ($19.234−$19.20−$0.768)−$0.734. A hashrate of 60 TH/s, at 8000 watts provides an operating efficiency of 133 watts/th. When the cryptocurrency mining machine 16 operates with the selected tune parameters as provided, the mining machine consumes 133 watts of power for every 1 th/s of hashing power. As shown in the third example, a further increase in power usage, and hashrate actually provides a lower net profit for the same digital coin mined at the same coin price, and difficulty with cryptocurrency mining machine 16 operating at the same price of electricity, and operating costs, and fees. As shown, the operating efficiency of the cryptocurrency mining machine 16 has greatly decreased as a result of the selected tuned chip parameters. Upon completion of the profit analysis phase, the cryptocurrency mining machine 16 is automatically tuned by selecting the tuned chip parameters provided in the second example, and the selected tuned chip parameters are applied to the ASIC chips to garner the highest profit when mining bitcoin. It is appreciated that tuned chip parameters which provide the highest profits are learned from the machine learning module/models/algorithms, and stored in a designated data table, data index, data file, and/or look-up table that is stored in memory on mother board 60, storage 52 of each computing device 12, 14, on database 24, and/or on server 26. Each cryptocurrency mining machine 16, 18, 20, nth may retrieve any of the tuned chip parameters, and directly apply the retrieved tuned chip parameters to the ASIC chips 66, 68, 70, 72. In one embodiment, auto-tuning may be performed using any of the retrieved tuned chip parameters to determine new target chip voltages, and target chip frequencies that provide the lowest power usage, and highest hash rate, and then initiate the profit analysis phase on the newly established tuned chip parameters. Thus, previously tuned parameters may be auto-tuned further to provide refined target chip voltage and target chip frequency.

As shown in the examples given, changes in profit variables correspond to changes in profit. An increase in hashrate, or coin price, and a decrease in difficulty, costs, fees, price of electricity, or power usage all result in higher profits. Each of the tuned chip parameters determined from selected chip profile configurations, provide different power usage, and hashrate values, respectively, which influence profits. Although increases in target chip frequency provide higher hashrates, increases in target chip voltages result in higher power usage which leads to diminishing returns in profit, an increase in chip temperature, and a reduction in operating efficiency of cryptocurrency mining machines 16, 18, 20, and nth. As illustrated in FIG. 10, an increase in both target chip voltage, and target chip frequency results in an increase in power usage, and hashrate, respectively, while the operating efficiency of cryptocurrency mining machine decreases as watts/th increases. An increase in hashrate generally corresponds to an increase in bitcoins, but an increase in power usage results in higher operating costs. As power usage rises, the operating efficiency of the cryptocurrency mining machines drop because the watts per th/s increases. As such, an increase in hashrate does not necessarily result in an increase in profits, because power usage also increases. In reviewing the three examples given, the cryptocurrency mining machine 16 operating at a target voltage of 18 volts, and target frequency of 800 MHz, as determined from the profit analysis phase, provides the most profit at $8.09 a day.

Each cryptocurrency mining machine 16, 18, 20, nth is rebooted to apply the tuned chip parameters associated with the chip profile configuration to the ASIC chips 66, 68, 70 and 72. Rebooting the cryptocurrency mining machines 16, 18, 20 nth is required to prevent the mining machines from crashing, to prevent chip instability, or to prevent loss of communication with ASIC chips. The need to constantly reboot cryptocurrency mining machines for applying target chip voltages and frequencies to ASIC chips can be costly, time consuming, and taxing on the mining machines, not to mention the down time of the mining machines. To overcome the need for rebooting, there is provided a chip setting process (CSP) 134 of the dynamic tuning firmware 100. During the chip setting process, each previously applied target chip voltage, and target chip frequency is dynamically adjusted in small increment or decrement values over a predefined period of time until arriving at the newly determined target chip voltage and target chip frequency associated with the newly selected chip profile configuration, or tuned chip parameters. In other words, in an exemplary embodiment, the voltage and/or frequency of the chip may be adjusted while maintaining the mining chip in a mining state, i.e., without having to restart the chip. The chip set algorithm may define an increment or decrement voltage and frequency value, and the rate at which the increment and decrement voltage and frequency values are applied. For example, the increment or decrement voltage values may include 0.1 volt to 1 volt, and increment or decrement frequency values may include 2 MHz to 50 MHz. The increment or decrement frequency may be applied in an integral, linear, derivative, stepped, exponential, or progressive manner, or any combination thereof. The rate at which the previous target chip voltage, and target chip frequency changes may include anywhere from 0.1 milliseconds to 3 seconds. In applying the chip set algorithm, the previous tuned parameters are adjusted over a predetermined of time, until arriving at the target chip voltage, and target chip frequency, of the newly applied chip profile configuration, or tuned chip parameters. When selectively switching from a target chip voltage, and target chip frequency having a high value, to a newly determined target chip voltage and target chip frequency having a lower value, auto-tuning, via the chip setting process, dynamically decreases previous target chip frequency first, until arriving at the new lower target chip frequency, and then subsequently decreases the higher target chip voltage until arriving at the new target chip voltage for managing power usage, and hashrate based on temperature and/or profit. Thus, the previous target chip frequency is adjusted first, and then the previous target chip voltage second. However, when selectively switching from a target chip voltage, and target chip frequency having a lower value to a target chip voltage, and target chip frequency having a higher value, auto-tuning, via the chip setting process, dynamically increases the previous lower target chip voltage first, via an increment or decrement voltage value, until reaching the new higher target chip voltage, and then subsequently increases the lower target chip frequency, via an increment or decrement frequency value, until reaching the new higher target chip frequency of the newly tuned parameters. In this scenario, the target chip voltage is adjusted first, and then the target chip frequency. It is appreciated that the chip setting process may be enabled or disabled by users. If the chip setting process is disabled by users, cryptocurrency mining machine 16, 18, 20, nth will automatically reboot each time, to apply newly determined target chip voltages, and target chip frequencies determined during auto-tuning, or newly determined tuned parameters determined during the profit analysis phase.

During auto-tuning, each cryptocurrency mining machine 16, 18, 20, nth processes a plurality of chip profile configurations to determine a plurality of tuned chip parameters each including a target chip voltage, and a target chip frequency for managing power usage and hashrate based on temperature. When auto-tuning initiates a profit analysis phase, a profit algorithm is applied to each tuned chip parameter to find which tuned chip parameters provide the highest profits, and applies the tuned chip parameters to the ASIC chips to garner the highest profit. When mining digital currency over time, the operating conditions and characteristics of the cryptocurrency mining machines, and more particularly of the ASIC chips 66, 68, 70, 72, generally become more defined, predictable, established, and known, Applying tuned chip parameters associated with chip profile configurations to ASIC chips 66, 68, 70, 72 based on predictive, defined, and reliable operating conditions, performance characteristics, and condition parameters, enhances the effective management, and operation of cryptocurrency mining machines 16, 18, 20, nth by reducing the time needed for auto-tuning, the ability to manage chip temperature more effectively, ability to enhance profits by reducing down time, reducing wear and tear on the equipment, and more importantly, increasing the efficiency of cryptocurrency mining machines when mining digital currency. To capitalize on such benefits, there is provided in one embodiment, a hierarchical storage manager for applying tuned chip parameters to ASIC chips 66, 68, 70, 72 in a more time saving, and cost effective manner. The hierarchical storage manager is governed by the hierarchical storage manager control process 132 of the dynamic tuning firmware 100. Previously tuned or learned chip parameters including target chip voltages, and target chip frequencies known to optimize the performance of ASIC chips can be classified in various hierarchical groups, or sub-groups according to predefined weights, rules or policies. For example, tuned chip parameters that are known to maintain chip temperature within a given temperature range, under certain operating conditions, may be classified in a first hierarchical group. A rule associated with the first hierarchical group may define a particular temperature range for given target chip voltages, and target chip frequencies. For example, a target chip voltage, and target chip frequency that provides a certain power usage, and hashrate value at a first chip temperature range may be classified in a first hierarchical group, while a target chip voltage, and target chip frequency that provides a certain power usage, and hashrate value at another chip temperature range, may be classified in a second hierarchical group. Alternatively, tuned chip parameters may be classified in certain hierarchical groups based on profit values, or profit thresholds. Tuned chip parameters that are applied less frequently, or increase chip temperatures, or provide less favorable profits may be classified in lower hierarchical groups. Each cryptocurrency mining machine 16, 18, 20, nth may retrieve the tuned chip parameters from any hierarchical group in accordance with predicated operating conditions, and/or condition parameters, and apply the retrieved tuned parameters to ASIC chips 66, 68, 70, 72 based on measured, calculated, or predicted operating conditions, or condition parameters. The hierarchical storage manager may be stored on computing devices 12, 14 as shown in FIG. 2, and accessible by each cryptocurrency mining machine, via communication network 22, or alternatively, the hierarchical may be stored in memory of the mother board 60 of each cryptocurrency mining machine 16, 18, 20, and nth. The hierarchical storage manager can operate in conjunction with, or in addition to, machine learning modules/models/algorithms. Some benefits of using a hierarchical storage manager include: 1), support for rule or policy-based organization of tuned chip parameters, 2), based on inputs provided by each cryptocurrency mining machine, or on condition parameters, or profit variables, the hierarchical storage manager can build its own rules and policies, and apply them to different settings, 3), hierarchical storage manager can increase the efficiency and performance of cryptocurrency mining machines by applying already tuned parameters known to work efficiently on predicted or known condition parameters, 4), can increase the speed of auto-tuning by classifying tuned chip parameters used less frequent in lower hierarchical groups, and 4), hierarchical storage manager can automatically perform on-line data backups of tuned parameters, during power outage, or loss of internet connection.

There may be circumstances where tuned chip parameters applied to ASIC chips to garner higher profits pose an issue regarding chip temperature. Thus there are times when it may be necessary for auto-tuning cryptocurrency mining machines 16, 18, 20, nth based on both temperature and profit. For example, assuming a profit interval is initiated, and one or more profit variables have changed so that when the profit analysis phase applies the profit algorithm to tuned parameters, auto-tuning determines that new tuned parameters including a higher target chip voltage, and higher target chip frequency provide for higher profits, and applies the new tuned parameters to the ASIC chips. However, due to a higher target chip voltage of the new tuned parameters, the temperature of ASIC chips also increases above a preconfigured downscale if chip temperature is higher as provided at 216 in FIG. 5 when the higher target chip voltage is applied to the ASIC chips. Because of the increase in temperature, auto-switch selectively switches to other tuned parameters associated with chip profile configurations for auto-tuning to find a target chip voltage, and target chip frequency that provides lower power consumption or usage to help reduce the heat. The preset chip profile configuration, associated with the tuned parameters that resulted in the ASIC chips overheating, is disabled for a set period of time and cannot be used in auto-switch and auto-tuning mode. Also, all preset chip profile configurations that include tuned parameters having higher target chip voltage values which would increase chip temperatures above acceptable temperature ranges are also disabled for a set period of time.

Since many modifications, variations, and changes in detail can be made to the described embodiments, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The full scope of the claims should be determined by both the appended claims and their legal equivalents.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

Reference to a "detonator holder and/or detonator" herein refers to at least one of a detonator holder and a detonator, and may be termed a detonation-related element for more convenient reference.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A method of managing a temperature of one or more mining chips provided on one or more hash boards configured in cryptocurrency miners that each include one or more processors in communication with memory, said method comprising:

retrieving, by said one or more processors, metric data comprising a temperature of said one or more mining chips, or a temperature of said one or more hash boards, said temperature measured by sensors provided within one or more of said cryptocurrency miners while mining digital currency, said metric data stored in said memory;

determining, by said one or more processors, based on said metric data, that said temperature of any of said one or more mining chips, or said temperature of any of said one or more hash boards exceeds a first temperature threshold;

upon determining that said temperature of any of said one or more mining chips, or said temperature of any of said one or more hash boards has exceeded said first temperature threshold, selecting, by said one or more processors, a chip profile configuration from a plurality of chip profile configurations stored in said memory, each of said plurality of chip profile configurations comprising chip voltages, and chip frequencies;

dynamically adjusting said selected chip profile configuration by decreasing a chip voltage selected from said chip voltages, or decreasing a chip frequency selected from said chip frequencies to provide a reduced hashrate, a target chip voltage, and a target chip frequency; and supplying said target chip voltage, and said target chip frequency to each of said one or more mining chips to operate each of said one or more mining chips at said reduced hashrate.

2. The method of claim 1, wherein subsequent to dynamically adjusting said selected profile configuration by decreasing said chip voltage, or decreasing said chip frequency, in response to determining that said temperature of any of said one or more mining chips, or said temperature of any of said one or more hash boards falls below said first temperature threshold;

gradually increasing said chip voltage by a voltage increment value, or increasing said chip frequency to provide a first hashrate, a first target chip voltage, and a first target chip frequency; and supplying said first target chip voltage and said first target chip frequency to each of said one or more mining chips to operate each of said one or more mining chips at said first hashrate.

3. The method of claim 2, further comprising:

determining, by said one or more processors, based on said metric data, that said temperature of any of said one or more mining chips, or said temperature of any of said one or more hash boards falls below a second temperature threshold, said first and second temperature threshold stored in said memory;

upon determining that said temperature of any of said one or more mining chips, or said temperature of any of said one or more hash boards falls below said second temperature threshold, selecting, by said one or more processors, another chip profile configuration from said plurality of chip profile configurations stored in said memory;

dynamically adjusting said selected another chip profile configuration by increasing another chip voltage, selected from chip voltages associated with said another chip profile configuration, or increasing another chip frequency selected from chip frequencies associated with said another chip profile configuration to increase a hashrate of said one or more mining chips to provide an increased hashrate, another target chip voltage, and another target chip frequency; and supplying said another target chip voltage, and said another target chip frequency to operate said one or more mining chips at said increased hashrate.

4. The method of claim 3, wherein dynamically adjusting said another chip profile configuration comprises gradually increasing said another chip voltage by a voltage increment value, and increasing said another chip frequency to provide a second hashrate, a second target chip voltage, and a second target chip frequency; and supplying said second target chip voltage and said second target chip frequency to each of said one or more mining chips to operate each of said one or more mining chips at said second hashrate.

5. The method of claim 4, wherein said first hashrate and said second hashrate comprises any of a fixed hashrate value, an ideal hashrate, or a percentage of an ideal hashrate.

6. The method of claim 5, wherein said sensors comprise any of: on-chip temperature sensors affixed to, or disposed adjacent to, each of said one or more mining chips, one or more environment temperature sensors, hash board temperature sensors, one or more internal temperature sensors provided within each of said cryptocurrency miners, fan encoder sensors, a voltage sensor, and humidity sensor.

7. The method of claim 6, wherein said metric data comprises any of: a temperature of each of said one or more mining chips, a temperature of each of said hash boards, hashrate of each of said one or more mining chips, an internal temperature of each of said cryptocurrency miners, an environmental temperature, a humidity value, a target chip voltage value, a target chip frequency value, a pulse width modification signal value, or percentage of duty cycle, and a speed value of cooling fans.

8. The method of claim 7, wherein retrieving metric data comprises retrieving metric data in real-time at predetermined time intervals.

9. The method of claim 7, wherein said chip voltages of each of said plurality of chip profile configurations comprises a chip voltage range including a maximum chip voltage and a minimum chip voltage, and said chip frequencies comprises a chip frequency range including a maximum chip frequency and a minimum chip frequency.

10. The method of claim 4, wherein said first temperature threshold comprises a first chip temperature threshold, and said second temperature threshold comprises a second chip temperature threshold.

11. The method of claim 4, wherein said target chip voltage, said first target chip voltage, said another target chip voltage, and said second target chip voltage is supplied to each of said one or more mining chips while said one or more mining chips are operating in a mining state, and said target chip frequency, said first target chip frequency, said another target chip frequency, and said second target chip frequency is supplied to each of said one or more mining chips while said one or more mining chips are operating in a mining state.

12. The method of claim 7, further including controlling a fan module in a constant fan mode, by said one or more processors, to generate and supply a pulse width modification signal to one or more cooling fans provided in each of said cryptocurrency miners to maintain rotational speed of each of said cooling fans at a constant speed independent of said temperature.

13. The method of claim 12, further including controlling said fan module in an automatic fan mode, and determining, by said one or more processors, that said temperature of any of said one or more mining chips, or any of said one or more hash boards has exceeded a target chip temperature, in response to determining that said temperature of any said one or more mining chips, or of any said one or more hash boards exceeds said target chip temperature, controlling said fan module, by said one or more processors, to gradually increase said pulse width modification signal supplied to said cooling fans to increase said rotational speed of said cooling fans until said temperature of any said one or more mining chips, or of any said one or more hash boards is equal to, or lower than, said target chip temperature wherein said pulse width modification signal provides a duty cycle to maintain said temperature below said target chip temperature, said constant fan mode being operatively inactive upon activation of said automatic fan mode.

14. The method of claim 2, wherein said reduced hashrate is greater than said first hashrate.

15. The method of claim 4, wherein said second hashrate is greater than said increased hashrate.

16. The method of claim 4, wherein said target chip voltage, said first target chip voltage, said another target chip voltage, and said second target chip voltage is supplied simultaneously to all of said one or more mining chips per a shared voltage supply configuration.

17. The method of claim 7, wherein said target chip voltage, said first target chip voltage, said another target chip voltage, and said second target chip voltage, each having the same or different voltage value, is supplied separately to each individual said one or more mining chips per a non-shared voltage supply configuration.

18. The method of claim 1, wherein dynamically adjusting said selected chip profile configuration comprises decreasing a chip voltage selected from said chip voltages, and decreasing a chip frequency selected from said chip frequencies to provided said reduced hashrate, said target chip voltage, and said target chip-frequency.

19. The method of claim 3, wherein dynamically adjusting said selected another chip profile configuration comprises increasing said another chip voltage, and increasing said another chip frequency to provide said increased hashrate, said another target chip voltage, and said another target chip frequency.

20. The method of claim 1, comprising:
determining, by said one or more processors, based on said metric data, that the temperature of any of said one or more mining chips, or the temperature any of said one or more hash boards reexceeds said first temperature threshold;
upon determining that said temperature of any of said one or more mining chips, or said temperature of any of said one or more hash boards re-exceeds said first temperature threshold, selecting, by said one or more processors, another chip profile configuration from a plurality of chip profile configurations stored in said memory;

dynamically adjusting said selected another chip profile configuration by decreasing another chip voltage, and decreasing another chip frequency to provide another target chip voltage, another target chip frequency, and another hashrate;

subsequent to dynamically adjusting said selected another profile configuration by decreasing said another chip voltage, and decreasing said another chip frequency, in response to determining that said temperature of any of said one or more mining chips, or of any of said one or more hash boards falls below said first temperature threshold, gradually increasing said another chip voltage by a voltage increment value, and increasing said another chip frequency to provide a first hashrate, a first target chip voltage, and a first target chip frequency; and supplying said first target chip voltage and said first target chip frequency to each of said one or more mining chips to operate each of said one or more mining chips at said first hashrate.

21. The method of claim 1, further comprising:
determining, by said one or more processors, based on said metric data, that the temperature of any of said one or more mining chips, or the temperature of any of said one or more hash boards exceeds said first temperature threshold;

upon determining that said temperature of any of said one or more mining chips, or said temperature of any of said one or more hash boards exceeds said first temperature threshold, retrieving said chip profile configuration from a first hierarchical group provided in a hierarchical storage manager stored in said memory, said hierarchical storage manager including a plurality of hierarchical groups each group including a plurality of chip profile configurations, and classified according to different temperature ranges, power usage, profits, or predetermined hashrates, said retrieved chip profile configuration including said target chip voltage and said target chip frequency associated with said reduced hashrate;

supplying said target chip voltage and said target chip frequency to each of said one or more mining chips;

upon supplying said target chip voltage and said target chip frequency to each of said one or more mining chips, redetermining whether said temperature of any of said one or more mining chips, or the temperature of any of said one or more hash boards exceeds said first temperature threshold;

upon redetermining that said temperature of any of said one or more mining chips, or said temperature of any of said one or more hash boards exceeds said first temperature threshold, retrieving a second chip profile configuration from said first hierarchical group, said second profile configuration including another target chip voltage and another target chip frequency associated with another predetermined hashrate; and supplying said another target chip voltage and said another target chip frequency to each of said one or more mining chips to operate each of said one or more mining chips at said another predetermined hashrate.

22. A mining device comprising:
a mother board including one or more processors in operable communication with memory;

a power supply in operable communication with said mother board;

a input-output interface in operable communication with said mother board;

a plurality of hash boards each comprising a plurality of mining chips, each of said hash board in operable communication with said mother board; and a dynamic tuning firmware provided in said memory that performs:

retrieving, by said one or more processors, metric data comprising a temperature of one or more of said plurality of mining chips, or a temperature of said one or more hash boards, said temperature measured by sensors provided within said mining device while mining digital currency;

determining, by said one or more processors, based on said metric data, that said temperature of said one or more of said plurality of mining chips, or said temperature of said one or more of said plurality of hash boards exceeds a first temperature threshold;

upon determining that said temperature of said one or more of said plurality of mining chips, or said temperature of said one or more of said plurality of hash boards exceeds said first temperature threshold, said one or more processors selecting a chip profile configuration from a plurality of chip profile configurations stored in said memory, each of said plurality of chip profile configurations including chip voltages, and chip frequencies;

dynamically adjusting said selected chip profile configuration by decreasing a chip voltage selected from said chip voltages, and decreasing a chip frequency selected from said chip frequencies to provide a reduced hashrate, a target chip voltage, and a target chip frequency; and generating a command signal to supply said target chip voltage, and said target chip frequency to each of said one or more of said plurality of mining chips to operate each of said one or more of said plurality of mining chips at said reduced hashrate.

23. The mining device of claim 22, wherein said dynamic tuning firmware performs:
determining, based on said metric data, that said temperature of said one or more of said plurality of mining chips, or said temperature of said one or more hash boards falls below a second temperature threshold, said first and second temperature threshold prestored in said memory;

upon determining that said temperature of said one or more of said plurality of mining chips, or said temperature of said one or more hash boards falls below said second temperature threshold, selecting another chip profile configuration from said plurality of chip profile configurations;

dynamically adjusting said selected another chip profile configuration by increasing another chip voltage and increasing another chip frequency to provide an increased hashrate, another target chip voltage, and another target chip frequency; and generating a command signal to supply said another target chip voltage, and said another target chip frequency to each of said one or more of said plurality of mining chips to operate said one or more of said plurality of mining chips at said increased hashrate.

24. The mining device of claim 23, wherein said reduced hashrate and said increased hashrate comprise any of a predetermined hashrate threshold, a fixed hashrate value, an ideal hashrate, or a percentage of an ideal hashrate.

25. The mining device of claim 24, wherein said sensors comprise any of: on-chip temperature sensors affixed to, or disposed adjacent to, each of said one or more mining chips, one or more environment temperature sensors, hash board temperature sensors, one or more internal temperature sensors provided within each of said cryptocurrency miners, and fan encoder sensors, voltage sensor, and humidity sensors.

26. The mining device of claim 25, wherein said metric data comprises any of: a temperature of each of said one or more mining chips, a temperature of each of said hash boards, hashrate of each of said one or more mining chips, an internal temperature of each of said cryptocurrency miners, an environmental temperature, a humidity value, a target chip voltage value, a target chip frequency value, a pulse width modification signal value or duty cycle value, and a speed value of cooling fans.

27. The mining device of claim 26, wherein said dynamic tuning firmware performs:
dynamically adjusting said selected chip profile configuration by decreasing said chip voltage or decreasing adjusting said chip frequency to provide said reduced hashrate, said target chip voltage, and said target chip frequency.

28. The mining device of claim 26, wherein said dynamic tuning firmware performs:
dynamically adjusting said another chip voltage or adjusting said another chip frequency comprises increasing said another chip voltage, or increasing said another chip frequency to provide said increased hashrate, said another target chip voltage, and said another target chip frequency.

29. The mining device of claim 23, wherein said target chip voltage, and said another target chip voltage is supplied to said one or more of said plurality of mining chips while said plurality of mining chips are operating in a mining state.

30. The mining device of claim 23, wherein said target chip frequency, and said another target chip frequency is supplied to said one or more of said plurality of mining chips while said plurality of mining chips are operating in a mining state.

31. A non-transitory computer-readable medium storing thereon computer-executable instructions that, when executed by one or more processors in communication with one or more cryptocurrency miners, each cryptocurrency miner including one or more hash boards each including mining chips, cause said one or more processors to perform;
retrieving, by said one or more processors in communication with memory, metric data comprising a temperature of one or more of said mining chips, or a temperature of said one or more hash boards, said temperature measured by sensors provided within said one or more cryptocurrency miners while mining digital currency;
determining, based on said metric data, that said temperature of any of said one or more of said mining chips, or said temperature of any of said one or more hash boards exceeds a first temperature threshold;
upon determining that said temperature of said one or more of said mining chips, or said temperature of any of said one or more hash boards exceeds said first temperature threshold, selecting, by said one or more processors, a chip profile configuration from a plurality of chip profile configurations stored in said memory, each of said plurality of chip profile configurations comprising chip voltages, and chip frequencies;
dynamically adjusting said selected chip profile configuration by decreasing a chip voltage selected from said chip voltages, or decreasing a chip frequency selected from said chip frequencies to lower a hashrate and provide a reduced hashrate, a target chip voltage, and a target chip frequency; and
supplying said target chip voltage, and said target chip frequency to each of said one or more of said mining chips to operate each of said one or more of said mining chips at said reduced hashrate.

32. The non-transitory computer-readable medium of claim 31, wherein subsequent to dynamically adjusting said selected profile configuration by decreasing said chip voltage, or decreasing said chip frequency, in response to determining that said temperature of said one or more of said mining chips, or that said temperature of any of said one or more hash boards falls below said first temperature threshold;
increasing said chip voltage by a voltage increment value, or increasing said chip frequency to provide a first hashrate, a first target chip voltage, and a first target chip frequency; and
supplying said first target chip voltage and said first target chip frequency to each of said one or more of said mining chips to operate each of said one or more of said mining chips at said first hashrate.

33. The non-transitory computer-readable medium of claim 32, wherein said computer-executable instructions further causes the one or more processors to perform:
retrieving metric data comprising a temperature of one or more of said mining chips, or a temperature of said one or more hash boards;
determining, based on said metric data, that the temperature of said one or of said more mining chips, or the temperature of any of said one or more hash boards falls below a second temperature threshold;
upon determining that said temperature of said one or more of said mining chips, or the temperature of any of said one or more hash boards falls below said second temperature threshold, selecting, by said one or more processors, another chip profile configuration from said plurality of chip profile configurations stored in said memory;
dynamically adjusting said selected another chip profile configuration by increasing another chip voltage, selected from chip voltages associated with said selected another chip profile configuration, or increasing another chip frequency selected from chip frequencies associated with said selected another chip profile configuration, to provide an increased hashrate, another target chip voltage, and another target chip frequency; and
supplying said another target chip voltage, and said another target chip frequency to each of said one or more of said mining chips to operate said each of said one or more of said mining chips at said increased hashrate.

34. The non-transitory computer-readable medium of claim 33, wherein subsequent to dynamically adjusting said another chip profile configuration by increasing said another chip voltage, or increasing said another chip frequency, in response to determining that said temperature of any of said one or more of said mining chips, or that said temperature of any of said one or more hash boards, is above said second temperature threshold, continuing to increase said another chip voltage by a voltage increment value, or continuing to increase said another chip frequency to provide a second hashrate, a second target chip voltage, and a second target chip frequency; and supplying said second target chip voltage and said second target chip frequency to each said one or more of said mining chips to operate each of said one or more of said mining chips at said second hashrate, said second hashrate being greater than said increased hashrate.

35. The non-transitory computer-readable medium of claim 34, wherein said first hashrate, and said second hashrate comprises any of a predetermined hashrate threshold, a fixed hashrate value, an ideal hashrate, or a percentage of an ideal hashrate.

36. The non-transitory computer-readable medium of claim 35, wherein said computer-executable instructions further causes said one or more processors to perform:

retrieving, by said one or more processors, metric data from sensors comprising any of: on-chip temperature sensors affixed to, or disposed adjacent to, each of said one or more mining chips, one or more environment temperature sensors, hash board temperature sensors, one or more internal temperature sensors provided within each of said cryptocurrency miners, fan encoder sensors, voltage sensors, and a humidity sensor.

37. The non-transitory computer-readable medium of claim 36, wherein said computer-executable instructions further causes said one or more processors to perform:

retrieving, by said one or more processors, metric data comprising any of a temperature of each of said one or more mining chips, a temperature of each of said hash boards, hashrate of each of said one or more mining chips, an internal temperature of each of said cryptocurrency miners, an environmental temperature, humidity, a target chip voltage value, a target chip frequency value, a pulse width modification signal value or duty cycle value, and a speed value of cooling fans.

38. The non-transitory computer-readable medium of claim 33, wherein said computer-executable instructions further causes said one or more processors to perform:

dynamically adjusting said selected chip profile configuration comprises decreasing said chip voltage, and decreasing said chip frequency to provide said reduced hashrate, said target chip voltage, and said target chip frequency, and dynamically adjusting said selected another chip profile configuration comprises increasing said another chip voltage, and increasing said another chip frequency to provide said increased hashrate, said another target chip voltage, and said another target chip frequency.

39. The non-transitory computer-readable medium of claim 34, wherein said computer-executable instructions further causes said one or more processors to perform:

providing for each of said plurality of chip profile configurations chip voltages that comprises a chip voltage range including a minimum chip voltage, and a maximum chip voltage, and providing for each of said plurality of chip profile configurations chip frequencies that comprises a chip frequency range including a minimum chip frequency and a maximum chip frequency.

40. The non-transitory computer-readable medium of claim 34, wherein said computer-executable instructions further causes the one or more processors to perform:

generating a command signal to supply said target chip voltage, said first target chip voltage, said another target chip voltage, and said second target chip voltage to each of said one or more mining chips while said one or more mining chips are operating in a mining state, and to supply said target chip frequency, said first target chip frequency, said another target chip frequency, and said second target chip frequency to each of said one or more mining chips while said one or more mining chips are operating in a mining state.

41. The non-transitory computer-readable medium of claim 37, wherein said computer-executable instructions further causes the one or more processors to perform:

controlling a fan module in a constant fan mode to generate and supply a pulse width modification signal to one or more cooling fans provided in each of said cryptocurrency miners to maintain rotational speed of each of said cooling fans at a constant speed independent of said temperature.

42. The non-transitory computer-readable medium of claim 41, wherein said computer-executable instructions further causes the one or more processors to perform:

controlling said fan module in an automatic fan mode, and determining, by said one or more processors, that said temperature of any of said one or more of said mining chips, or said temperature any of said one or more hash boards has exceeded a target chip temperature, in response to determining that said temperature of any said one or more of said mining chips, or said temperature of any said one or more hash boards exceeds said target chip temperature, controlling said fan module, by said one or more processors, to gradually increase said pulse width modification signal supplied to said cooling fans to increase said rotational speed of said cooling fans until said temperature of any said one or more of said mining chips, or said temperature of any said one or more hash boards becomes equal to, or lower than, said target chip temperature wherein said pulse width modification signal provides a duty cycle to maintain said temperature below said target chip temperature, said constant fan mode being operatively inactive upon activation of said automatic fan mode.

43. The non-transitory computer-readable medium of claim 37, wherein said computer-executable instructions further causes the one or more processors to perform:

supplying said target chip voltage, said first target chip voltage, said another target chip voltage, or said second target chip voltage simultaneously to all of said one or more mining chips at once per a shared voltage supply configuration.

44. The non-transitory computer-readable medium of claim 37, wherein said computer-executable instructions further causes the one or more processors to perform:

supplying said target chip voltage, said first target chip voltage, said another target chip voltage, or said second target chip voltage having a same or different voltage value to each individual of said one or more mining chips per a non-shared voltage supply configuration.

45. The non-transitory computer-readable medium of claim 37, wherein said first temperature threshold comprises a first chip temperature threshold, and said second temperature threshold comprises a second chip temperature threshold.

46. The non-transitory computer-readable medium of claim 31, wherein said computer-executable instructions further causes the one or more processors to perform:

retrieving metric data comprising a temperature of said one or more of said mining chips, or a temperature of said one or more hash boards, said temperature measured by sensors provided within said one or more cryptocurrency miners while mining digital currency;

determining, based on said metric data, whether the temperature of any of said one or more of said mining chips, or the temperature any of said one or more hash boards has exceeded said first temperature threshold;

upon determining that said temperature of any of said one or more of said mining chips, or said temperature of any of said one or more hash boards exceeds said first temperature threshold, retrieving said chip profile configuration from a first hierarchical group provided in a hierarchical storage manager stored in said memory, said hierarchical storage manager including a plurality of hierarchical groups each group comprising a plurality of profile configurations, and classified according to different temperature ranges, power usage, profits, or predetermined hashrates, said chip profile configuration including said target chip voltage and said target chip frequency associated with said reduced hashrate;

generating a command signal to supply said target chip voltage and said target chip frequency to each of said one or more of said mining chips;

subsequent to supplying said target chip voltage and said target chip to each of said one or more of said mining chips, redetermining whether said temperature of any of said one or more of said mining chips, or said temperature of any of said one or more hash boards exceeds said first temperature threshold;

upon redetermining that said temperature of any of said one or more of said mining chips, or the temperature of any of said one or more hash boards exceeds said first temperature threshold, retrieving a second chip profile configuration from said first hierarchical group, said second profile configuration including another target chip voltage and another target chip frequency associated with another predetermined hashrate; and generating a command signal to supply said another target chip voltage and said another target chip frequency to each of said one or more of said mining chips to operate said one or more of said mining chips at said another predetermined hashrate.

47. The non-transitory computer-readable medium of claim 31, wherein said computer-executable instruction further causes the one or more processors to perform:

determining, based on said metric data, that the temperature of said one or more mining chips, or the temperature of any of said one or more hash boards reexceeds said first temperature threshold;

upon determining that said temperature of said one or more mining chips, or said temperature of any of said one or more hash boards re-exceeds said first temperature threshold, selecting, by said one or more processors, another chip profile configuration from a plurality of chip profile configurations stored in said memory;

dynamically adjusting said selected another chip profile configuration by decreasing another chip voltage, and decreasing another chip frequency to reduce a hashrate of said one or more mining chips;

subsequent to dynamically adjusting said selected another profile configuration by decreasing said another chip voltage, and decreasing another chip frequency, in response to determining that said temperature of any of said one or more mining chips, or said temperature of any of said one or more hash boards falls below said first temperature threshold, increasing said another chip voltage by a voltage increment value, and increasing said another chip frequency to increase said hashrate of said one or more mining chips to provide an increased hashrate, another target chip voltage and another target chip frequency; and generating a command signal to supply said another target chip voltage and said another target chip frequency to each of said one or more of said mining chips to to operate each of said one or more of said mining chips at said increased hashrate.

48. The non-transitory computer-readable medium of claim 46, wherein said computer-executable instructions further causes the one or more processors to perform:

accessing a machine learning module stored within said memory to perform machine learning using said target chip voltages, said target chip frequencies, temperatures of said one or more mining chips, temperatures of said one or more hash boards, or said hashrates, said machine learning module communicating with said hierarchical storage manager to reclassify each of said plurality of hierarchical groups according to power usage of said cryptocurrency miners, power usage of said one or more mining chips, temperature of said one or more mining chips, or hashrate.

49. A non-transitory computer-readable medium storing thereon computer-executable instructions that, when executed by one or more processors in communication with one or more cryptocurrency miners, each cryptocurrency miner including one or more hash boards each having a plurality of mining chips, cause said one or more processors to perform:

retrieving metric data comprising an environmental temperature, or an internal temperature of said cryptocurrency miners, said environmental temperature, or said internal temperature measured by one or more sensors provided within, or adjacent to, said one or more cryptocurrency miners while mining digital currency;

determining, based on said metric data, that said environmental temperature, or said internal temperature exceeds a first chip temperature threshold;

upon determining that said environmental temperature, or said internal temperature exceeds said first chip temperature threshold, selecting a chip profile configuration from a plurality of chip profile configurations stored in said memory, each of said plurality of chip profile configurations comprising chip voltages, and chip frequencies;

dynamically adjusting said selected chip profile configuration by decreasing a chip voltage selected from said chip voltages, and decreasing a chip frequency selected from said chip frequencies to reduce a hashrate of each of said plurality of mining chips;

subsequent to dynamically adjusting said selected chip profile configuration by decreasing said chip voltage, and decreasing said chip frequency, in response to determining that said environmental temperature, or said internal temperature falls below said first chip temperature threshold, increasing said chip voltage by a voltage increment value, and increasing said chip frequency to increase said hashrate of each of said plurality of mining chips to provide a target chip hashrate, a target chip voltage and a target chip frequency; and generating a command signal to supply said target chip voltage and said target chip frequency to each of said plurality of mining chips to operate each of said plurality of mining chips at said target hashrate.

50. The non-transitory computer-readable medium of claim 49, wherein said computer-executable instructions further causes the one or more processors to perform:
- retrieving metric data comprising said environmental temperature, or said internal temperature that is measured by one or more environment sensors, one or more internal sensors, or a combination of one or more environment sensors and one or more internal sensors.

51. The non-transitory computer-readable medium of claim 49, wherein said computer-executable instructions further causes said one or more processors to perform:
- dynamically adjusting said selected chip profile configuration comprising decreasing said chip voltage, or decreasing said chip frequency to provide said target hashrate, said target chip voltage, and said target chip frequency.

\* \* \* \* \*